(12) United States Patent
Kominami et al.

(10) Patent No.: US 11,897,687 B2
(45) Date of Patent: Feb. 13, 2024

(54) DISCHARGE APPARATUS FOR FLYING OBJECT, LIQUID DRIPPING PREVENTION MEMBER, AND CONTROL METHOD OF DISCHARGE APPARATUS FOR FLYING OBJECT

(71) Applicant: TOYO SEIKAN CO., LTD., Tokyo (JP)

(72) Inventors: Atsushi Kominami, Yokohama (JP); Souji Araki, Yokohama (JP)

(73) Assignee: TOYO SEIKAN CO., LTD., Tokyo (JP)

( * ) Notice: Subject to any disclaimer, the term of this patent is extended or adjusted under 35 U.S.C. 154(b) by 252 days.

(21) Appl. No.: 17/629,459

(22) PCT Filed: Jul. 17, 2020

(86) PCT No.: PCT/JP2020/027939
§ 371 (c)(1),
(2) Date: Jan. 24, 2022

(87) PCT Pub. No.: WO2021/015139
PCT Pub. Date: Jan. 28, 2021

(65) Prior Publication Data
US 2022/0234814 A1 Jul. 28, 2022

(30) Foreign Application Priority Data
Jul. 23, 2019 (JP) .................. 2019-135207

(51) Int. Cl.
*B64D 1/18* (2006.01)
*B65D 83/34* (2006.01)
(Continued)

(52) U.S. Cl.
CPC ............ *B65D 83/34* (2013.01); *B64C 39/024* (2013.01); *B64D 1/18* (2013.01); *B64U 10/13* (2023.01); *B64U 2101/00* (2023.01)

(58) Field of Classification Search
CPC ..................................................... B65D 83/34
(Continued)

(56) References Cited

U.S. PATENT DOCUMENTS

| 2011/0285783 A1 | 11/2011 | Sakata et al. |
| 2015/0060452 A1 | 3/2015 | Ito |

(Continued)

FOREIGN PATENT DOCUMENTS

| CN | 2016-44252 U | 11/2010 |
| CN | 102256802 A | 11/2011 |

(Continued)

OTHER PUBLICATIONS

Office Action in CN Application No. 202080053553.7 dated Apr. 20, 2023, 25 pages.

(Continued)

*Primary Examiner* — Jeremy Carroll
(74) *Attorney, Agent, or Firm* — MARSHALL, GERSTEIN & BORUN LLP

(57) ABSTRACT

A discharge apparatus for a flying object is provided, which discharges liquid material from a nozzle mounted on an airframe and includes a lid that is capable of opening and closing a discharge port of the nozzle.

20 Claims, 18 Drawing Sheets

(51) Int. Cl.
  *B64C 39/02* (2023.01)
  *B64U 10/13* (2023.01)
  *B64U 101/00* (2023.01)
(58) Field of Classification Search
  USPC .......................................................... 222/108
  See application file for complete search history.

(56) References Cited

U.S. PATENT DOCUMENTS

| | | | |
|---|---|---|---|
| 2019/0270433 A1* | 9/2019 | Hester | B60S 1/50 |
| 2019/0291866 A1* | 9/2019 | Jegodtka | B64C 39/024 |
| 2020/0142414 A1* | 5/2020 | Tullman | G01V 3/16 |
| 2020/0145789 A1* | 5/2020 | Tullman | H04W 4/40 |
| 2021/0061543 A1 | 3/2021 | Murakami | |
| 2022/0177129 A1* | 6/2022 | Formoso | F42B 12/40 |

FOREIGN PATENT DOCUMENTS

| | | |
|---|---|---|
| CN | 207170102 U | 4/2018 |
| JP | 2001-088879 A | 4/2001 |
| JP | 2001-158487 A | 6/2001 |
| JP | 2009-240982 A | 10/2009 |
| JP | 2016-190669 A | 11/2016 |
| JP | 2017-104063 A | 6/2017 |
| JP | 2017-137070 A | 8/2017 |
| JP | 2018-191610 A | 12/2018 |
| WO | WO-2019/138576 A1 | 7/2019 |

OTHER PUBLICATIONS

Office Action in JP Application No. 2019-135207 dated Mar. 3, 2020, 6 pages.
Office Action in JP Application No. 2020-075639 dated Apr. 6, 2021, 8 pages.
Office Action in JP Application No. 2020-075640 dated Apr. 6, 2021, 6 pages.
Search Report in International Application No. PCT/JP2020/027939 dated Sep. 29, 2020, 10 pages.

* cited by examiner

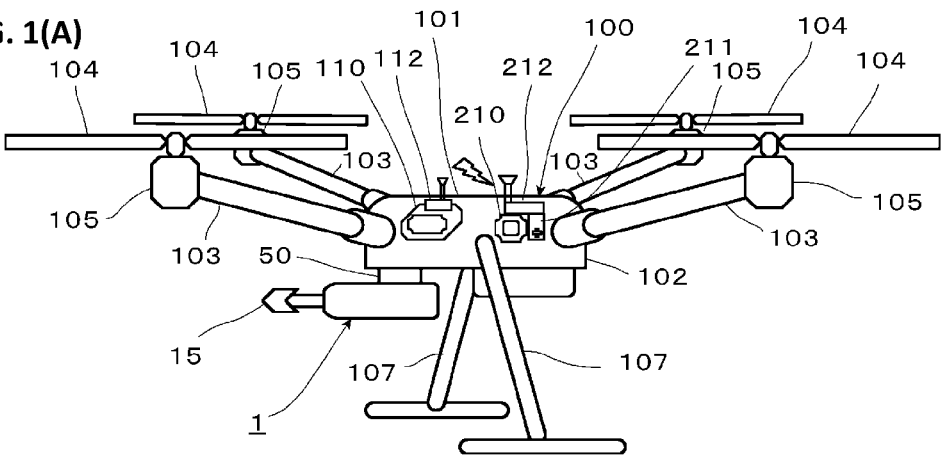
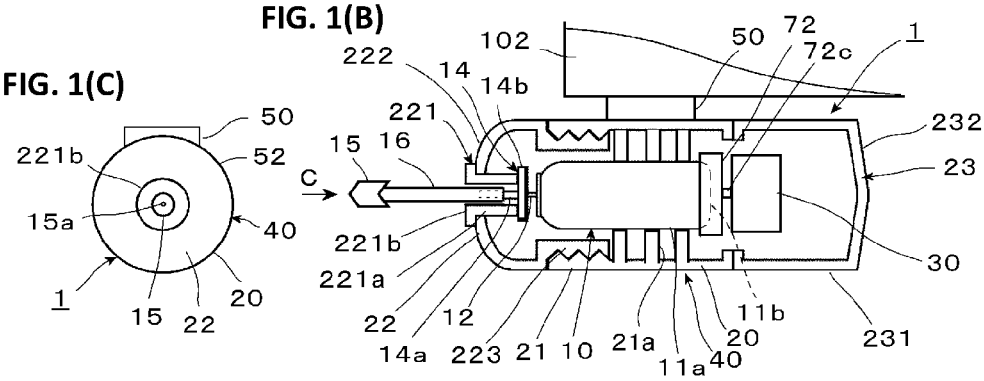
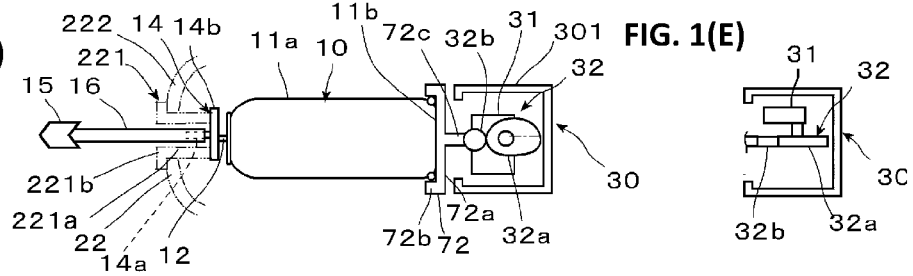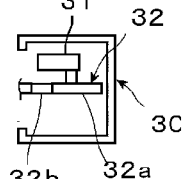
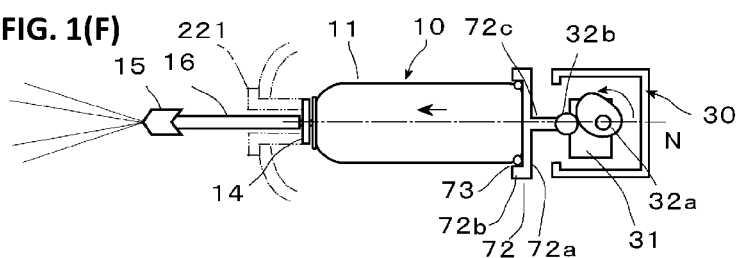

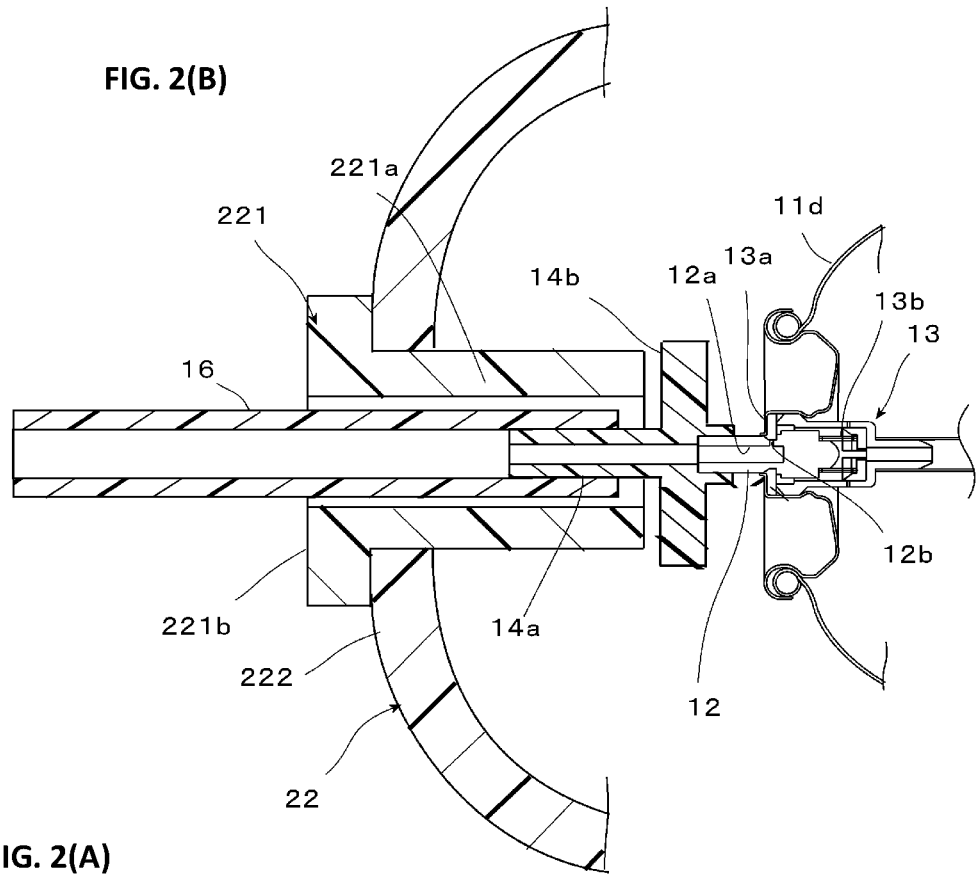
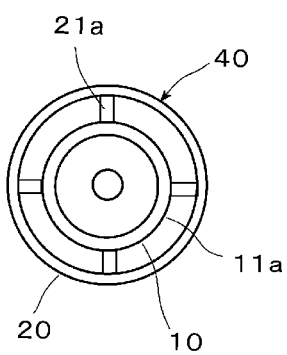
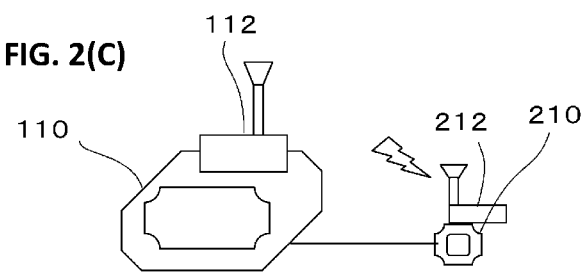

DISCHARGE APPARATUS FOR FLYING OBJECT, LIQUID DRIPPING PREVENTION MEMBER, AND CONTROL METHOD OF DISCHARGE APPARATUS FOR FLYING OBJECT

TECHNICAL FIELD

The present invention relates to a discharge apparatus for a flying object, a liquid dripping prevention member, and a control method of the discharge apparatus for the flying object, and in particular, relates to a technique for preventing liquid dripping from a discharge apparatus mounted on a moving object such as an unmanned flying object.

BACKGROUND ART

Conventionally, as an example of this type of discharge apparatus for an unmanned flying object (moving object), a bee extermination apparatus as described in PTL 1 has been known. That is, the bee extermination apparatus includes, inside the airframe thereof, a chemical agent supply unit for supplying a chemical agent to a bee nest, and a jetting instrument as a discharge apparatus is mounted on this chemical agent supply unit.

CITATION LIST

Patent Literature

Japanese Patent Application Publication No. 2017-104063

SUMMARY OF INVENTION

Technical Problem

When liquid material is discharged from a discharge apparatus, a part of the discharged material adheres to a nozzle of the discharge apparatus. When the amount of the adhered material increases, there is a possibility that the liquid material forms droplets and causes liquid dripping. Such liquid dripping is unfavorable from the viewpoint of the impact upon the surrounding environment, etc.

An object of the present invention is to provide a technique for preventing liquid dripping from a discharge apparatus mounted on a flying object.

Solution to Problem

In order to achieve the above object, the present invention provides a discharge apparatus for a flying object, the discharge apparatus discharging liquid material from a nozzle mounted on an airframe, the discharge apparatus including: a lid that is capable of opening and closing a discharge port of the nozzle.

By using such a discharge apparatus, liquid dripping from the nozzle can be prevented.

This discharge apparatus can be configured as follows.

1. The discharge apparatus includes a driving unit that opens and closes the lid.

Since the lid can be opened and closed, the nozzle can be opened at the time of discharge and can be closed at the time other than discharge.

2. The lid rotates via a hinge to open and close the discharge port.

The use of the hinge enables smooth opening and closing operations.

3. The hinge is provided to be positioned further upward than the discharge port in a perpendicular direction when the flying object is in a flight state.

As a result, even when the opening and closing mechanism fails, liquid dripping can be prevented.

4. The lid has a concave portion that is provided at a position facing the discharge port when in a closed state and that prevents interference with the discharge port.

As a result, contact between the members can be prevented.

5. The lid opens and closes the discharge port by sliding in a direction perpendicular to a discharge direction of the liquid material.

6. The lid slides by rotational movement or linear movement.

7. The lid is a diaphragm mechanism having a plurality of diaphragm blades.

These various methods may be used as a method for controlling the lid.

8. The lid and the discharge port are positioned such that the discharge port does not abut on the lid when the lid is in a closed state.

Thus, no abutting occurs even when the lid is opened and closed.

9. The lid is provided with an absorbent material that absorbs the liquid material at a position facing the discharge port when the lid is in a closed state.

As a result, the liquid material dripping near the lid can be absorbed so that the liquid dripping can be prevented.

10. The lid is opened and closed by pressure generated when the liquid material is discharged.

This simplifies the configuration of the opening and closing mechanism.

In order to achieve the above object, the present invention provides a discharge apparatus for a flying object, the discharge apparatus discharging liquid material from a nozzle mounted on an airframe, the discharge apparatus including: a solidifying unit that receives and fixes the liquid material that has dripped from a discharge port of the discharge apparatus.

As a result, the liquid material that has dripped is fixed and prevented from spilling outside.

This discharge apparatus can be configured as follows.

1. The solidifying unit includes an absorbent material.

Thus, the liquid material can be absorbed and prevented from spilling out.

2. The discharge apparatus includes a lid that is capable of opening and closing a discharge port of the nozzle, wherein the solidifying unit is provided at a position facing the discharge port when the lid is in a closed state.

In this way, the liquid overflowing from the discharge port can be effectively solidified.

3. The discharge apparatus includes a protruding part that protrudes forward in a discharge direction from the discharge port, wherein the solidifying unit is provided on the protruding part.

4. The protruding part is formed of the solidifying unit.

Accordingly, the liquid can be solidified in the solidifying unit provided on or configuring the protruding part.

5. The solidifying unit includes a permeation part that allows the liquid material discharged from the discharge port to permeate therethrough and the absorbent material that absorbs the liquid material that has permeated through the permeation part.

Thus, the permeation part permeates the liquid material and can suppress expansion, etc. of the absorbent material that has absorbed the liquid material.

In order to achieve the above object, the present invention provides a discharge apparatus for a flying object, the discharge apparatus discharging liquid material from a nozzle mounted on an airframe, the discharge apparatus including: a receiving unit that is provided forward in a discharge direction of the discharging from a discharge port of the discharge apparatus, so as to receive the liquid material that has dripped from the discharge port.

As a result, the overflowing liquid material can be received and prevented from leaking to the outside.

This discharge apparatus can be configured as follows.

1. The receiving unit has a storage portion that stores the liquid material.

Thus, even when a certain amount of liquid material overflows, it is possible to handle the overflow.

2. The storage portion is a bag-shaped member provided forward in a discharge direction when viewed from the discharge port.

Thus, the liquid material can be efficiently stored.

3. The receiving unit has a protruding surface that protrudes further downward than the discharge port in a perpendicular direction when the flying object is in a flight state and forward in a discharge direction when viewed from the discharge port.

In this way, it is possible to handle liquid dripping that occurs during flight and to prevent the liquid from spilling.

4. The protruding surface is provided with an absorbent material that absorbs the liquid material.

5. The protruding surface is provided with a damming portion for preventing leakage of the liquid material.

6. The protruding surface is provided with a concave portion that stores the liquid material.

7. The concave portion is provided in plurality and forward in a discharge direction when viewed from the discharge port.

In this way, since various structures can be used for preventing liquid dripping, it is possible to increase the degree of freedom of design by appropriately selecting the structure.

8. The discharge apparatus further includes a lid that is openable and closable, the lid forming a closed space together with the protruding surface in a discharge direction from the discharge port when in a closed state, and enabling the liquid material to be discharged to outside from the discharge port when in an open state.

Thus, the liquid dripping prevention effect can be further enhanced.

9. The protruding surface is a bottom portion of a cylindrical part protruding from a periphery of the discharge port.

10. The discharge apparatus further includes a lid that is openable and closable, the lid covering a front end of the cylindrical part when in a closed state, and enabling the liquid material to be discharged to outside from the discharge port when in an open state.

The liquid dripping prevention effect can be further enhanced by providing the cylindrical part or providing the lid on the cylindrical part.

In order to achieve the above object, the present invention provides a liquid dripping prevention member, which is attachable to and detachable from a discharge apparatus for a flying object, the discharge apparatus discharging liquid material from a nozzle mounted on an airframe.

This facilitates replacement or the like of the liquid dripping prevention member.

This liquid dripping prevention member can be configured as follows.

1. The liquid dripping prevention member includes an engaging portion configured to attach the liquid dripping prevention member to the discharge apparatus for the flying object.

2. The engaging portion is a screw portion provided in the liquid dripping prevention member and engages with a screw portion provided in the discharge apparatus for the flying object.

3. The engaging portion is a fitting portion where the liquid dripping prevention member and the discharge apparatus for the flying object are fitted to each other so as to be engaged.

With these configurations, the maintainability of the liquid dripping prevention member is improved.

4. The liquid dripping prevention member has, on an outer peripheral surface thereof, an anti-slip portion.

This facilitates replacement of the liquid dripping prevention member.

In order to achieve the above object, the present invention provides a control method for controlling a discharge apparatus for a flying object, the discharge apparatus discharging liquid material from a nozzle mounted on an airframe, the control method including: a step of opening and closing a lid provided at a discharge port of the nozzle.

As a result, liquid dripping from the nozzle can be prevented.

In order to achieve the above object, the present invention provides a control method of a discharge apparatus for a flying object, the discharge apparatus including an opening and closing mechanism and a lid capable of opening and closing a discharge port of a nozzle, the control method comprising:

causing, in coordination with a discharge operation by a discharge driving unit, a lid driving unit, which drives the lid, to perform an operation for closing the lid when the discharge operation ends and to perform an operation for opening the lid when the discharge operation starts.

As a result, the nozzle is opened when the liquid material is discharged, and liquid dripping from the nozzle can be prevented when the liquid material is not discharged.

Advantageous Effects of Invention

As described above, according to the present invention, there is provided a technique for preventing liquid dripping from a discharge apparatus mounted on a flying object.

BRIEF DESCRIPTION OF DRAWINGS

FIG. 1 conceptually illustrates a discharge apparatus for a flying object on which the discharge apparatus according to the present invention is mounted and illustrates a case where an aerosol container is used as the discharge apparatus. FIG. 1(A) is a diagram illustrating an overall configuration of the flying object, FIG. 1(B) is a cross-sectional view of the discharge apparatus, FIG. 1(C) is a view taken in the direction of an arrow C of FIG. 1(B), FIG. 1(D) is an explanatory diagram illustrating a state before discharge, FIG. 1(E) is a plan view of a discharge driving unit of FIG. 1(D), and FIG. 1(F) is an explanatory diagram illustrating a state during discharge.

FIG. 2(A) is a cross-sectional view taken in a direction perpendicular to the axis of a sleeve in FIG. 1 in a case where a radial support member is provided, FIG. 2(B) is a diagram illustrating an example of a valve mechanism of the aerosol container in FIG. 1, and FIG. 2(C) is a diagram illustrating an example of using the power source of a flight control unit as a power source.

FIG. 5 is cross-sectional views conceptually illustrating a liquid dripping prevention member of an aerosol container according to Embodiment 1.

FIG. 6 illustrates a liquid dripping prevention member of an aerosol container according to Embodiment 2.

FIG. 7 illustrates a liquid dripping prevention member of an aerosol container according to Embodiment 3.

FIG. 8 illustrates a liquid dripping prevention member of an aerosol container according to Embodiment 4.

FIG. 9 illustrates a liquid dripping prevention member of an aerosol container according to Embodiment 5.

FIG. 11 illustrates a liquid dripping prevention member of an aerosol container according to Embodiment 7.

FIG. 12 illustrates a liquid dripping prevention member of an aerosol container according to Embodiment 8.

FIG. 13 illustrates a liquid dripping prevention member of an aerosol container according to Embodiment 9.

FIG. 14 illustrates a liquid dripping prevention member of an aerosol container according to Embodiment 11.

FIG. 15 illustrates a liquid dripping prevention member of an aerosol container according to Embodiment 11.

FIG. 16 illustrates a configuration of a cylindrical part of a liquid dripping prevention member of an aerosol container according to Embodiment 12.

FIG. 17 illustrates a configuration of a cylindrical part of a liquid dripping prevention member of an aerosol container according to Embodiment 13.

DESCRIPTION OF EMBODIMENTS

Figure 3A:
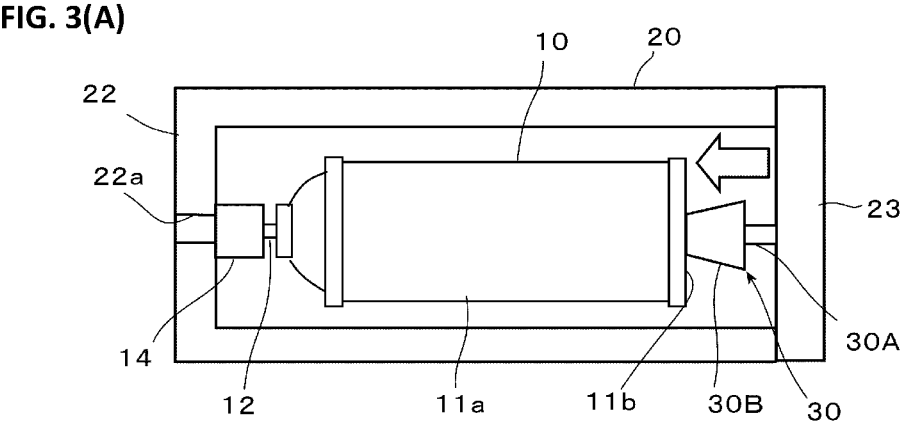
FIGS. 3(A) to (C) are diagrams illustrating three methods of the discharge driving unit.

Hereinafter, the present invention will be described in detail based on the embodiments illustrates in the drawings.

Dimensions, materials, shapes, relative arrangements, and the like of components described in the following embodiments can be changed as appropriate according to a configuration of an apparatus to which the invention is applied and various conditions and are not intended to limit the scope of the invention to the following embodiments.

Embodiment 1

First, an overall configuration will be described with reference to FIGS. 1(A) to 1(C). FIG. 1 conceptually illustrates a discharge apparatus for a flying object according to Embodiment 1 of the present invention. FIG. 1(A) is a perspective view of the entire flying object on which the discharge apparatus is mounted, FIG. 1(B) is a cross-sectional view of the discharge apparatus mounted on the flying object, and FIG. 1(C) is a view of FIG. 1(B) when viewed from a C direction.

In FIG. 1(A), a reference numeral 100 represents a flying object. The flying object 100 is an unmanned aerial vehicle such as a so-called multicopter. An airframe 101 includes an airframe body 102, four arms 103 radially extending from the airframe body 102, and legs 107 for takeoff and landing. Four rotors 104 are provided at the respective ends of the arms 103 via respective motors 105. In the illustrated example, a quadcopter with four rotors 104 is illustrated. However, various known multicopters such as a tricopter with three rotors and a hexacopter with six rotors are applicable. A yaw axis, a roll axis, and a pitch axis of the airframe 101 are an up-down direction, a left-right direction, and a front-back direction of the paper plane, respectively. An upper side of the paper plane is an upper side of the airframe 101, and a left side of the paper plane is a front side of the airframe 101.

A discharge apparatus 1 in which an aerosol container is stored is mounted on the outside of the airframe 101 of the flying object 100, that is, on the undersurface of the airframe body 102 in the illustrated example, via a discharge apparatus supporting part 50. The discharge apparatus 1 has a long body and is disposed with its longitudinal direction oriented in the roll axis direction, and a nozzle 15 protrudes from a front end portion of the discharge apparatus 1 toward the front of the airframe.

As illustrated in FIG. 1(B), the discharge apparatus 1 has an aerosol container 10 and discharges contents of the aerosol container 10 in a state of being mounted on the airframe 101. The contents to be discharged may be not only a liquid but also a liquid containing gas, a gaseous body such as air, power, and the like.

The aerosol container 10 is mounted on the airframe 101 in a state of being housed in a sleeve (housing member) 20. A discharge driving unit 30 for discharging the contents from the aerosol container 10 is built in the sleeve 20. The sleeve 20 and the aerosol container 10 are replaceable as one unit. In the following description, an assembly in a state where the aerosol container 10 is housed in the sleeve 20 will be referred to as an aerosol container assembly 40. Hereinafter the configuration of each part will be described.

[Aerosol Container]

The aerosol container 10 is a container that ejects contents by gas pressure of compressed gas or liquefied gas filled therein, and an existing aerosol container made of metal can be applied, or a container made of plastic having pressure resistance can be used. Various types of actuators each of which has a flow path formed based on a discharge direction or a discharge pattern can be mounted on a stem 12 of the aerosol container 10. In the illustrated example, an actuator 14 is attached to the stem 12 of the aerosol container 10. The actuator 14 includes a linear main body 14a having a straight discharge flow path and a flange portion 14b protruding from the main body 14a in an axis-perpendicular direction. The nozzle 15 having a jetting hole 15a (see FIG. 1(C)) is connected to the main body 14a of the actuator 14 via a coupling tube 16. Whether the contents are discharged in the form of mist or in the form of linear jet flow is selected as appropriate depending on the discharge pattern and the discharge direction of the contents.

In the illustrated example, since the aerosol container 10 is used while being horizontally mounted on the undersurface of the airframe 101, a propellant and the contents to be sealed in this container take a form of isolated type, in which a concentrate product is accommodated in an inner bag, and the propellant is accommodated between the outer periphery of the inner bag and the inner periphery of the container main body. Such an isolated type enables the discharge even when the posture of the aerosol container is lateral (the position of the stem is lateral) or downward (the position of the stem is downward). When liquid material is discharged as the contents of the aerosol container 10, the liquid material may be discharged in a gel form, a mist form, or the like, in addition to a droplet form.

However, the container is not limited to the isolate type. When the aerosol container 10 is used in a posture in which the stem 12 faces upward during discharge, a two-phase or three-phase container provided with a dip tube can be applied. When the aerosol container 10 is used with the stem facing downward, a two-phase or three-phase container with no dip tube can be applied.

The propellant is preferably a compressed gas such as carbon dioxide ($CO_2$), nitrogen ($N_2$), or nitrous oxide ($N_2O$). In addition, a liquefied gas such as a common hydrocarbon (liquefied petroleum gas: LPG), dimethyl ether (DME), or a fluorinated hydrocarbon (HFO-1234ZE) is also applicable. However, in consideration of safety against fire when heating is performed, a non-flammable fluorinated hydrocarbon, carbon dioxide, nitrogen, nitrous oxide, and the like are preferable, and nitrogen is particularly preferable in consideration of environmental loads.

[Configuration of Sleeve 20]

The sleeve 20 is made of a metal such as aluminum, plastic, or a lightweight material having high strength such as carbon fibers. In addition, not only a hard material but also a soft material, for example, rubber material such as silicone rubber or urethane foam can be used. In short, various materials capable of holding the shape of the housing unit that houses the aerosol container 10 can be used. The term "sleeve" is used to mean a tubular member in which the cylindrical aerosol container 10 is housed.

The sleeve 20 includes a sleeve main body 21 having a cylindrical shape with a diameter larger than that of the aerosol container 10, a first end cover part 22 covering one end of the sleeve main body 21, and a second end cover part 23 provided at the other end.

The first end cover part 22 is detachably screwed and fixed to the sleeve main body 21 via a screw part, and the second end cover part 23 is undetachably fixed to the sleeve main body 21. The second end cover part 23 and the sleeve main body 21 may be integrally formed.

The first end cover part 22 includes a dome-shaped cover main body 222 and a screw cylinder 223 that is screwed into a female screw portion in the sleeve main body 21. The cover main body 222 has a conical shape with a rounded tip or a dome-shaped curved surface whose diameter is gradually reduced toward the tip end, in consideration of aerodynamic characteristics. With such a shape having good aerodynamic characteristics, an impact of wind (crosswind) in the horizontal direction is reduced, and stable flight can be achieved.

The discharge driving unit 30 is housed in the second end cover part 23 located on the bottom side of the aerosol container 10. The second end cover part 23 includes a cylindrical part 231 that has one end fixed to the rear end portion of the sleeve main body 21 (the end portion on the bottom side of the aerosol container 10) and an end plate 232 that closes the other end of the cylindrical part 231.

[Support Structure of Aerosol Container 10]

The inner diameter of the sleeve 20 is larger than the outer diameter of a body portion 11*a* of the aerosol container 10. In the sleeve 20 of the present configuration, the aerosol container 10 is positioned with both end parts, such as a head portion and a bottom portion, being supported by the first end cover part 22 and a container holding part 72. As illustrated in the drawing, when the aerosol container 10 is separated and supported at a certain distance from the wall surface of the sleeve 20, a heat insulating material or a heat storage material can be interposed in the separation space. However, the body portion 11*a* of the aerosol container 10 may be supported without being separated from the inside wall of the sleeve 20.

Further, as illustrates in FIG. 1(B), the inside wall of the sleeve 20 may be provided with a plurality of radial support parts 21*a* each of which supports the aerosol container 10 from a direction intersecting the axial direction of the container. The radial support parts 21*a* support the aerosol container 10 with respect to the sleeve 20 such that movement in the axial direction is allowed and movement in the orthogonal direction is prevented. As a support structure, the individual radial support parts 21*a* may have partial contacts with the body portion 11*a* of the aerosol container 10 at respective positions in the circumferential direction, or the radial support part 21*a* may support the entire circumference with an annular wall.

The sleeve 20 may not have a sealed structure but may have a structure in which a part of the structure is ventilated. For example, a structure such as a mesh structure or punching can be applied. Such a structure has effects of alleviating the self-cooling with outside air at the time of aerosol discharge, reducing the weight of the sleeve 20, etc.

The bottom portion 11*b* of the aerosol container 10 is supported by the container holding part 72 disposed on the second end cover part 23 side, and the head portion side of the aerosol container 10 is supported by a pressing member 221 provided on the first end cover part 22.

The pressing member 221 includes a cylindrical body 221*a* protruding from the top portion of the first end cover part 22 toward the stem 12 in the central axis direction of the aerosol container 10 and an end flange portion 221*b* provided at one end of the cylindrical body 221*a* and fixed to the first end cover part 22. The coupling tube 16 connecting the actuator 14 and the nozzle 15 is inserted into the inner periphery of the cylindrical body 221*a* of the pressing member 221 in a manner slidable to the axial direction, and the end surface of the cylindrical body 221a abuts on or is adjacent to the flange portion 14b of the actuator 14. The pressing member 221 may be formed integrally with the second end cover part 23.

Next, the discharge driving unit 30 will be described with reference to FIGS. 1(D) to 1(F).

The discharge driving unit 30 is disposed closer to the second end cover part 23 than to the bottom portion 11b of the aerosol container 10 in the second end cover part 23. The discharge driving unit 30 is fixed to the second end cover part 23 and moves the aerosol container 10 along the axial direction so as to discharge and stop discharging the contents of the aerosol container 10.

The discharge driving unit 30 moves the aerosol container 10 to the head portion side in the axial direction by pushing the aerosol container 10 in the axial direction from the bottom portion 11b side. The actuator 14 is pressed against the cylindrical body 221a of the pressing member 221 by the movement of the aerosol container 10, and the reaction force thereof generated pushes the stem 12 into the aerosol container 10 so that a valve mechanism of the aerosol container 10 is opened. When the valve mechanism is opened, the contents are automatically discharged by gas pressure.

The discharge driving unit 30 includes a motor 31 serving as a rotary drive source and a cam mechanism 32 that converts rotation of the motor 31 into linear motion of the container holding part 72. The motor 31 and the cam mechanism 32 are assembled to a frame 301 fixed to the second end cover part 23. The cam mechanism 32 is provided with a cam 32a that is driven to rotate by the motor 31 and a cam follower 32b that moves along a cam surface of the cam 32a. The rotation of the cam 32a is transmitted to the container holding part 72 on the driven side via the cam follower 32b and linearly moves the container holding part 72 in a direction of a container central axis N of the aerosol container 10. The cam 32a in the illustrated example is an oval disk cam, and a cam shaft is orthogonal to the central axis of the aerosol container 10. With this configuration, the rotation of the cam 32a is converted into linear motion of the aerosol container 10. Since the cam 32a is a circular disk cam, pressing means such as a spring for maintaining the cam follower 32b in constant contact with the cam 32a is provided as appropriate.

Usually, the minimum-diameter portion of the cam 32a abuts on the cam follower 32b, and the container holding part 72 is at a retreat limit position so that the valve mechanism of the aerosol container 10 is held in a valve-closed state (FIG. 1(D)). When the cam 32a is rotated by the motor 31, the container holding part 72 moves forward in the axial direction. That is, the contact position where the cam 32a abuts on the cam follower 32b at the retreat limit position is set to have a small radius from the rotation center, and the contact position where the cam 32a abuts on the cam follower 32b at the forward limit position is set to have a large radius from the rotation center. In the illustrated example, while the valve is opened not at the maximum-diameter portion of the cam 32a but at a transition portion from the minimum-diameter portion to the maximum-diameter portion, the valve may be configured to be opened at the maximum-diameter portion.

[Configuration of Valve]

FIG. 2(B) illustrates an example of a valve mechanism 13 of the aerosol container 10 by which a valve is opened by the discharge driving unit 30.

That is, the stem 12 is provided with a discharge flow path 12a that extends by a predetermined dimension in the axial direction from an end opening, and a stem hole 12b serving as a valve hole is opened on a side surface of the stem 12. This stem hole 12b is sealed by the inner peripheral surface of a gasket 13a mounted on a hole edge of an insertion hole of a mounting cup 11d.

Usually, the stem 12 pressed in a protruding direction by gas pressure and the pressing force of a spring 13b applies pressure in the axial direction to the inner peripheral edge of the gasket 13a serving as a valve body, and this brings the inner peripheral surface of the gasket 13a into close contact with the hole edge of the stem hole 12b constituting a valve seat. The valve-closed state is thereby maintained.

When the container holding part 72 is moved to the forward limit by the above-described cam mechanism 32 of the discharge driving unit 30, the aerosol container 10 is moved toward the first end cover part 22 side, and the flange portion 14b of the actuator 14 abuts on the end surface of the pressing member 221. This relatively pushes the stem 12 toward the inside of the container by the reaction force. When the stem 12 is pushed in, the inner peripheral edge of the gasket 13a is bent toward the inside of the container, and the inner peripheral surface of the gasket 13a is separated from the hole edge of the stem hole 12b so that the valve is opened. The contents pushed by the gas pressure is thereby discharged from the discharge flow path 12a of the stem 12.

The valve mechanism 13 in the illustrated example is an example and is not limited to such a configuration. Various configurations in which the valve-closed state is usually maintained and the valve is opened by pushing in the stem 12 can be applied.

In this example, the rotary motion of the motor 31 is converted into linear motion by the cam mechanism 32. However, the present invention is not limited to the cam mechanism 32. For example, any mechanism that converts the rotary motion of the motor 31 into linear motion, such as a screw feed mechanism or a rack-and-pinion mechanism, can be applied. Alternatively, instead of the rotary motor, a linear drive source such as a linear motor for linear drive or an electromagnetic solenoid may be used to move the aerosol container 10 in the axial direction without using the motion conversion mechanism.

In addition, the nozzle 15 is provided with various kinds of liquid dripping prevention members 700, which will be described below, or the nozzle 15 itself functions as a liquid dripping prevention member 700. Further, a nozzle member located further forward than a discharge port in the discharge direction, which is particularly important for exhibiting the liquid dripping prevention function, may be considered as the liquid dripping prevention member 700. In a case where electric control is needed to exhibit liquid dripping prevention effects, such as the liquid dripping prevention member 700 including a mechanism for opening and closing a lid, the liquid dripping prevention member 700 is connected to a power source by electric wiring. Further, a power source may be disposed in the liquid dripping prevention member 700. The liquid dripping prevention member 700 is configured to be attachable to and detachable from the discharge apparatus.

[Container Holding Part 72]

The container holding part 72 will be described with reference to FIGS. 1(D) to 1(F).

The container holding part 72 includes a circular plate portion 72a that abuts on the bottom portion 11b of the aerosol container 10, an annular convex portion 72b that holds the end portion on the bottom side of the body portion 11a of the aerosol container 10 from the outer-diameter end portion of the circular plate portion 72a, and a coupling axial portion 72c provided at the center portion of the motor-side surface of the circular plate portion 72a. An anti-slip material 73 that increases the friction force against the container body portion is mounted on the annular convex portion 72b.

[Configuration Example of Discharge Driving Unit]

The discharge driving unit 30 illustrated in FIG. 1 is an example, and other methods illustrated in FIG. 3 can also be applied as the configuration of the discharge driving unit 30. In FIG. 3, the sleeve 20 is represented by a square for simplification.

FIG. 3(A) illustrates a configuration in which the actuator 14 side of the aerosol container 10 is fixed to the sleeve 20, and a contact member 30B that abuts on the bottom portion 11b of the aerosol container 10 is pushed upward by a driving part 30A. The discharge driving unit 30 in FIG. 1 is an example of this method. In this method, since the actuator 14 side attached to the stem 12 is fixed, the accuracy of the discharge position is improved. Further, this method can correspond to the aerosol containers 10 of various diameters.

Figure 3B:
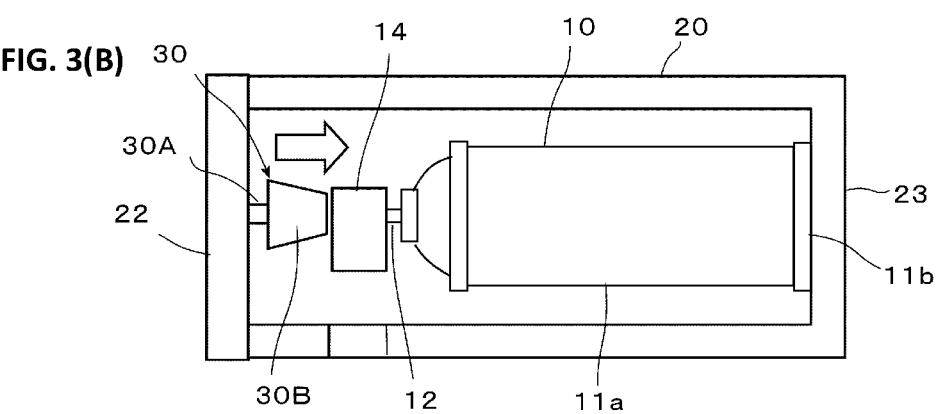

FIG. 3(B) illustrates a configuration in which the aerosol container 10 is fixed to the sleeve 20, and the stem 12 is pushed downward by the discharge driving unit 30 via the actuator 14. That is, the discharge driving unit 30 drives in a direction in which the contact member 30B abutting on the actuator 14 is pushed downward by the driving part 30A. In this way, the mechanical mechanisms can be concentrated on one side of the aerosol container 10 so that a compact and easy-to-replace structure is achieved. Further, this method can correspond to the aerosol containers 10 of various heights.

Note that the driving part 30A in FIGS. 3(A) and 3(B) can have any configuration as long as a mechanism for driving in a linear direction is used. For example, a motion conversion mechanism such as a cam mechanism that converts the rotary motion of the rotary motor into motion in a linear direction or a screw feed mechanism may be used, or instead of using the rotary motor, a linear motor for linear drive, an electromagnetic solenoid, or the like may be used.

Figure 3C:
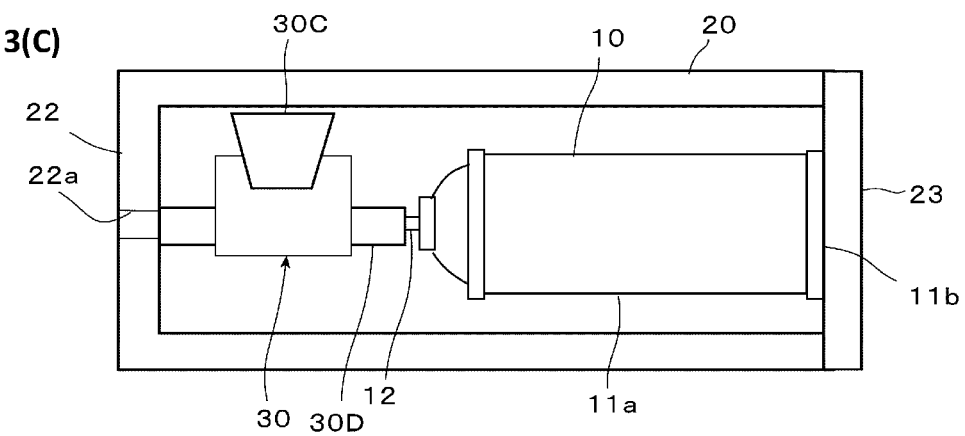

FIG. 3(C) illustrates a configuration in which an external valve 30C, instead of the valve inside the aerosol container 10, is used for control. In the drawing, the external valve 30C is conceptually illustrated, and a configuration in which opening and closing are driven by using an electromagnetic valve or the like is achieved. When the external valve 30C is used, since the stem 12 of the aerosol container 10 is simply connected to a duct 30D, the aerosol container 10 is easily attached, and the opening and closing control operation is easily performed. In a case of using the existing aerosol container 10, for example, when the aerosol container 10 is assembled, the stem 12 is pushed in so as to constantly hold the internal valve in an open state.

[Electric Facility]

Next, returning to FIG. 1(A), an electric facility for driving the discharge driving unit 30 will be described. FIG. 1(A) conceptually illustrates an electric facility mounted on the flying object.

A discharge apparatus control unit 210 is a control apparatus that controls the discharge driving unit 30 and is provided independently from a flight control unit 110, which controls the flight of the flying object 100, on the airframe 101 side, together with the flight control unit 110. Further, a discharge apparatus power supply 211 that drives the discharge driving unit 30 is provided independently from a power supply that drives the flying object 100 (which is incorporated in the flight control unit 110 and is not illustrated) and is mounted on the airframe 101 side.

Further, a discharge apparatus communication unit 212 including an antenna for remotely controlling the discharge apparatus 1 is provided independently from a flight communication unit 112 including an antenna for remotely controlling the flying object 100 and is mounted on the airframe 101.

Part or all of the flight control unit 110, the flight communication unit 112, and the flight power supply may serve as the discharge apparatus control unit 210, the discharge apparatus communication unit 212, and the discharge apparatus power supply 211. FIG. 2(C) illustrates an example in which a power supply provided in the flight control unit 110 is shared.

In a case where a control unit, a power supply unit, and a communication unit for operating the liquid dripping prevention member 700 are needed, the discharge apparatus control unit 210, the discharge apparatus power supply 211, and the discharge apparatus communication unit 212 may serve as the control unit, the power supply unit, and the communication unit.

[Structure to Support Discharge Apparatus on Airframe]

The discharge apparatus supporting part 50 that supports the discharge apparatus 1 on the airframe 101 may have, for example, a slide-type fitting structure using a slide rail and a T-shaped groove, or an attachable and detachable structure in a rotational direction such as bayonet coupling. Further, various support means that facilitate attachment and detachment, such as screwing, clip coupling, and clamping, can also be applied, and the discharge apparatus supporting part 50 may be provided with a direction changing device such as a gimbal.

Further, the discharge apparatus supporting part 50 may be provided with an electrical contact that electrically connects the discharge apparatus control unit 210 and the discharge apparatus power supply 211 disposed on the airframe 101 side to the motor 31 of the discharge driving unit 30, or a connector disposed on the airframe 101 may directly be connected from the sleeve 20 by a cable or the like. In addition, a power supply such as a secondary battery and a wireless communication device may be provided in the sleeve 20, and an electric signal from the flight control unit 110 disposed on the airframe 101 side may be transmitted to and received from the discharge apparatus control unit 210 in the sleeve 20 by wireless communication.

Next, the operations of the discharge apparatus for the flying object according to the present invention will be described.

[Replacement Operation]

The aerosol container assembly 40 for replacement in which the aerosol container 10 is housed in the sleeve 20 as illustrated in FIG. 1(B) is prepared in advance. Upon replacement, the aerosol container assembly 40 is detached from the discharge apparatus supporting part 50, and a new aerosol container assembly 40 is attached thereto. For example, by configuring the discharge apparatus supporting part 50 such that the attaching and detaching can be easily performed by a manual operation without using a tool, the replacement is easily performed. After the replacement of the aerosol container assembly 40, the aerosol container 10 is removed from the sleeve 20, and the gas and contents in the aerosol container 10 are completely discharged for disposal. The sleeve 20 can be repeatedly used. In addition, with this embodiment, it is possible to replace only the aerosol container 10 while the sleeve 20 is fixed to the airframe 101.

[Spraying Operation]

Figure 4A:
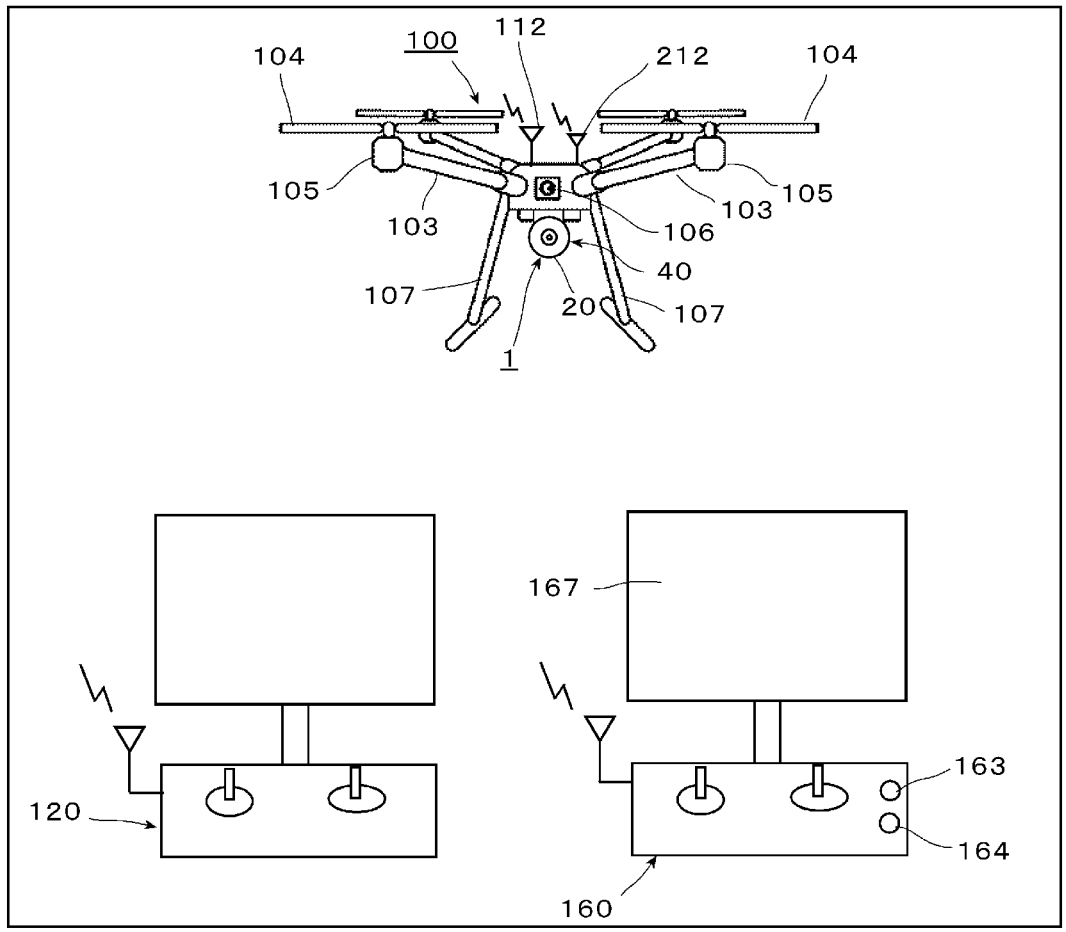
FIG. 4(A) is an explanatory diagram illustrating an example of a remote-control operation by a control terminal of a flying object on which a discharge apparatus is mounted and a discharge operation terminal.
Figure 4B:
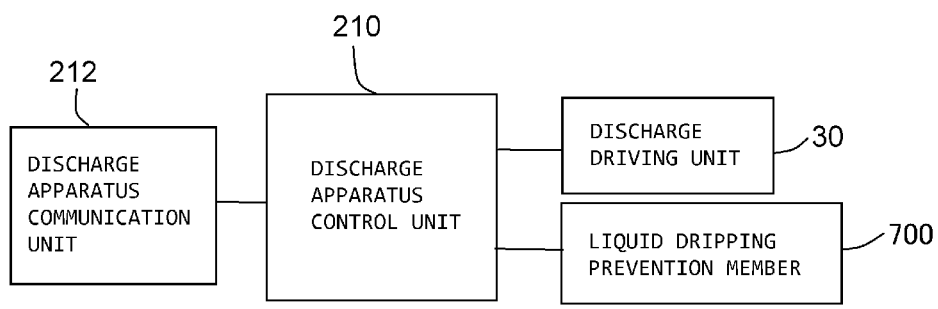
FIG. 4(B) is a control block diagram.

Next, Spraying operation will be described with reference to FIG. 4. FIG. 4(A) is an explanatory diagram illustrating an example of remote-control operations of a control terminal and an operation terminal of the flying object on which the discharge apparatus is mounted, and FIG. 4(B) is a simple control block diagram.

In the spraying operation, as illustrated in FIG. 4(A), the flight of the flying object 100 is remotely controlled by a control terminal 120, and the discharge apparatus 1 is remotely controlled by an operation terminal 160. The operation terminal 160 is also used as a controller of a camera 106 mounted on the flying object 100. The operation terminal 160 is provided with, for example, a discharge button 163, a stop button 164, and a display 167.

When an operator presses the discharge button 163, a discharge operation is performed. In this operation, a discharge command signal is transmitted, the transmitted signal is received by the discharge apparatus communication unit 212 mounted on the flying object 100, and the contents are discharged. That is, when the operator presses the discharge button 163 while viewing an image on the display 167, a discharge command signal is transmitted, and the discharge apparatus communication unit 212 mounted on the flying object 100 receives the transmitted signal. This causes the discharge apparatus control unit 210 to drive the discharge driving unit 30, and the stem 12 of the aerosol container 10 is pushed in. The contents are thereby discharged. When the operator presses the stop button 164, a stop command signal is transmitted, and the pushing of the stem 12 is released by the discharge driving unit 30 so that the discharge is stopped.

In a case where the liquid dripping prevention member 700 needs to be controlled at the time of discharge, for example, a lid that is openable and closable is provided, and in a case where the lid needs to be opened at the time of discharge, the control operation for opening the lid is performed manually or automatically before the start of the discharge.

[Configuration Example of Liquid Dripping Prevention Member]

Figure 5A:
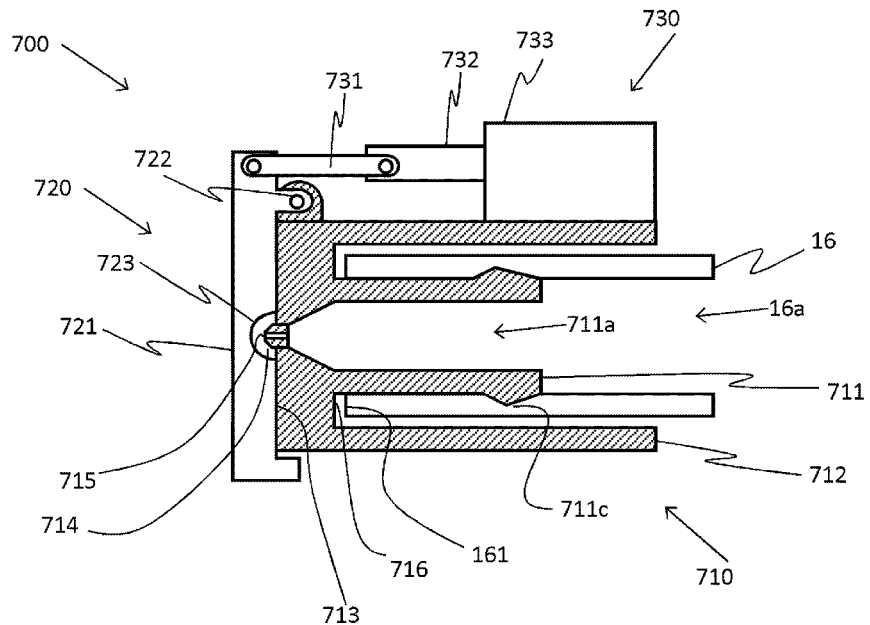
FIG. 5(A) illustrates a closed state.
Figure 5B:
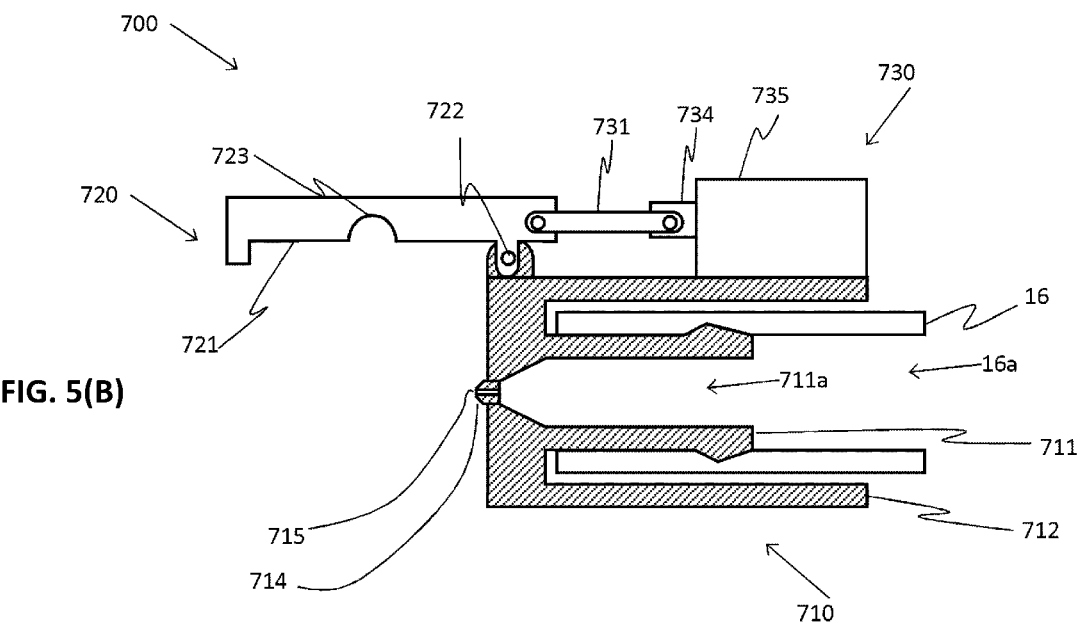
FIG. 5(B) illustrates an open state.

FIG. 5(A) illustrates the liquid dripping prevention member 700 in the closed state, and FIG. 5(B) illustrates the liquid dripping prevention member 700 in the open state. The liquid dripping prevention member 700 according to the present embodiment roughly includes a mounting part 710 that maintains connection with the coupling tube 16 when mounted, a lid 720 that is openable and closable, and a prevention member driving unit 730 (driving unit) that opens and closes the lid.

The mounting part 710 indicated by hatching in the drawing includes an inner fitting part 711 and an outer fitting part 712 as a configuration for fitting the coupling tube 16 with each other. The inner fitting part 711 is a short tubular member that protrudes in the longitudinal direction so as to be inserted into the tube at the time of fitting. The outer diameter of the inner fitting part 711 is smaller than the inner diameter of the coupling tube 16. Further, a pressure contact portion 711c is formed near the protruding end of the inner fitting part 711. Since the outer diameter of the pressure contact portion 711c is larger than the inner diameter of the coupling tube 16, when the elastic inner fitting part 711 is inserted into the coupling tube, the pressure contact portion 711c presses the coupling tube 16 from the inside. Thus, the friction between the coupling tube 16 and the inner fitting part 711 increases, and the connection is thereby maintained.

The outer fitting part 712 is a short tubular member having an inner diameter larger than the outer diameter of the coupling tube 16 such that the coupling tube 16 is inserted into the inside of the outer fitting part 712.

An end surface 713 of the mounting part 710 is provided with a tip portion 714 protruding outward. A passage hole 715 for liquid material is formed inside the tip portion 714. This enables the shape of the discharge port to be changed only by replacing the tip portion 714, compared to a case where the end surface 713 is simply provided with a hole serving as a discharge port. Thus, greater versatility can be achieved.

With this configuration, an inner space 16a of the coupling tube 16, an inner space 711a of the mounting part 710, and a passage area for liquid material formed as the passage hole 715 are formed, and the discharge port is disposed at the front end of the passage hole 715.

According to the liquid dripping prevention member 700 of the present configuration, the existing coupling tube 16 can be mounted without making any change, and the discharge performance as the nozzle 15 can be maintained. Note that the configuration of the mounting part is not limited to this configuration. For example, a method in which the outer fitting part 712 abuts on the coupling tube 16 and is fixed by friction may be used, or a configuration in which the coupling tube 16 abuts on both the outer fitting part 712 and the inner fitting part 711 may be used. Further, a front end portion 161 of the coupling tube 16 may be positioned by abutting on an inner wall 716 of the base of the mounting part 710.

The lid 720 includes a flat plate-shaped lid main body 721 connected to the mounting part 710 by a lid connection part 722. The lid main body 721 has an area that covers at least the front end portion 161. The lid connection part 722 has a hinge structure and rotatably supports the lid main body 721. As illustrated in FIG. 5(B), a lid body concave portion 723 having a size that prevents interference (contact) between the tip portion 714 and the lid main body 721 even in the closed state is formed in the lid main body 721 at a position facing the tip portion 714 in the closed state.

The lid main body 721 is connected to a linear motion part 732 of the prevention member driving unit 730 (driving unit) via a linear motion connecting member 731. Both ends of the linear motion connecting member 731 are configured as hinges.

The prevention member driving unit 730 according to the present embodiment is a solenoid actuator. In a base 733 of the prevention member driving unit 730, the linear motion part 732 that is movable to the left and right in the drawing in accordance with a command from the discharge apparatus control unit 210 is disposed. The driving unit is not limited to the solenoid actuator. As long as the driving unit has an opening and closing mechanism capable of opening and closing the lid main body 721, for example, an electric-field-responsive polymer actuator, an artificial muscle actuator such as a dielectric elastomer, a rack-and-pinion mechanism using an electric motor in combination, a worm rack mechanism, or a slide cam mechanism may also be used.

In the illustrated example, the hinge of the lid connection part 722 for connecting the lid main body 721 to the mounting part 710 is provided to be positioned above the discharge port in a perpendicular direction when the airframe is in a flight state. With this arrangement, even when the opening and closing mechanism does not work due to a failure of the driving unit during flight, the lid main body 721 maintains the state of covering the discharge port due to gravity. Thus, it is possible to prevent liquid dripping until the airframe returns.

By using the prevention member driving unit 730 (lid driving unit) of the present configuration, the nozzle is maintained in the closed state while the discharge is not performed, switched to be in the open state only while the discharge is performed, and switched again to be in the closed state when the discharge ends. Thus, it is possible to prevent liquid dripping from the front end of the nozzle.

The trigger for opening and closing the lid may be a direct instruction from the operator. In this case, the operation terminal 160 may be provided with an opening button and a closing button of the lid, in addition to the discharge button 163 and the stop button 164. Alternatively, the nozzle may be normally maintained in the closed state, and the discharge apparatus control unit 210 may drive the solenoid actuator by interlocking with the pressing of the discharge button 163 to switch the nozzle to be in the open state. In this way, by interlocking the discharge operation with the opening and closing operations of the lid, both the discharge and the liquid dripping prevention can be achieved.

In addition, even with a configuration that does not have a mechanism for opening and closing the lid by power, the lid can be opened and closed by pressure generated when the liquid material is discharged. In this case, the configuration of the opening and closing mechanism can be simplified.

<Variation>

In the embodiment described above, the aerosol container is configured as a container for liquid material, and the discharge apparatus is an aerosol discharge apparatus. However, the discharge apparatus of the present invention is not limited to an aerosol discharge apparatus.

Figure 18:
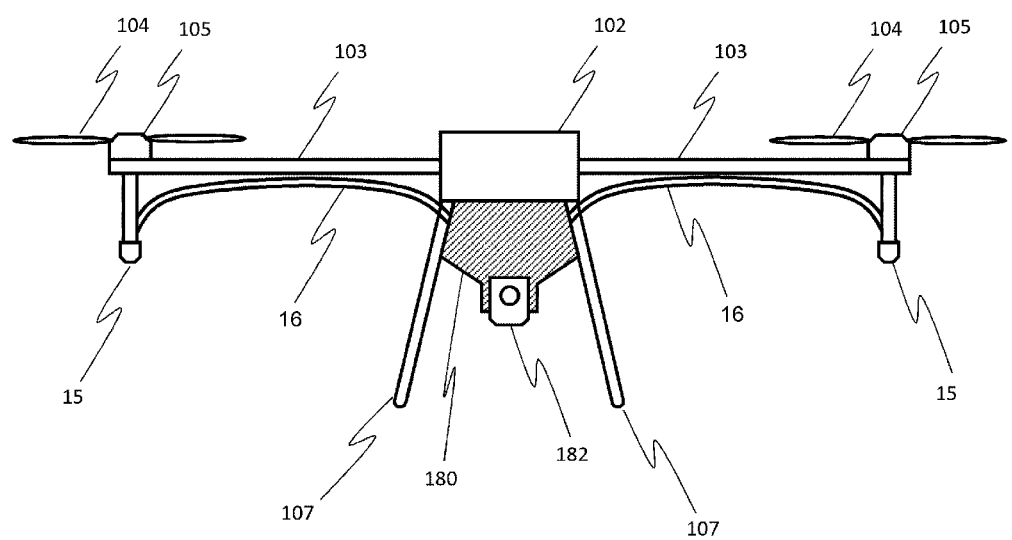
FIG. 18 conceptually illustrates a flying object on which a discharge apparatus according to the present invention is mounted and is a diagram illustrating an overall configuration of the flying object in a case where a pump and a tank are used as the discharge apparatus.

FIG. 18 illustrates an example of an unmanned aerial vehicle having a discharge apparatus including a liquid tank 180, a pump 182 that pumps liquid to a nozzle, a coupling tube 16 as a pipe, which is a flow path of the liquid from the pump to the nozzle, and a nozzle 15 as a discharge port. The tank 180 holds liquid to be discharged. When a spraying operation starts, the pump 182 is operated to pump the liquid. The liquid passes through a coupling tube 184 and is sprayed from the nozzle 15. By providing the above-described liquid dripping prevention member on the nozzle 15, liquid dripping from the discharge apparatus is prevented.

Next, other embodiments of the discharge apparatus of the present invention will be described. In the following description, only the difference from the above-described embodiment will be described. The same components will be denoted by the same reference numerals, and descriptions thereof will be omitted.

Embodiment 2

A liquid dripping prevention member 700 according to Embodiment 2 will be described with reference to FIGS. 6(A) to 6(C). The liquid dripping prevention member of the present embodiment also includes a lid 720. However, the mechanism for opening and closing the lid is different. That is, the present embodiment uses a method in which the lid 720 changes its position in a direction intersecting the discharge direction of the discharge material.

Figure 6A:
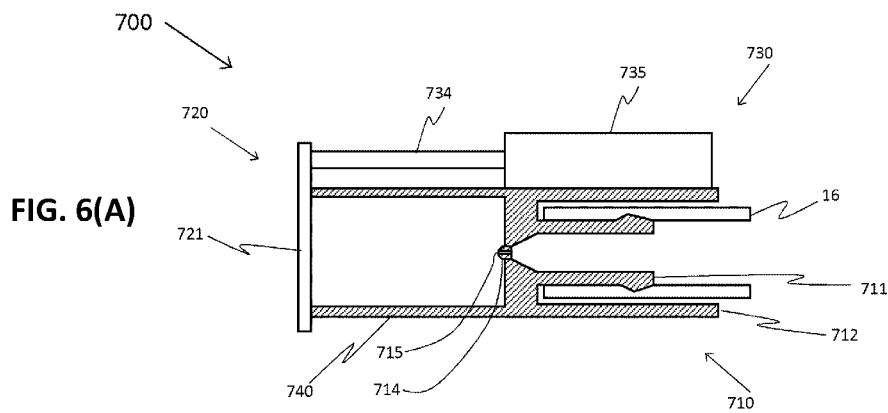
FIG. 6(A) is a cross-sectional view.
Figure 6B:
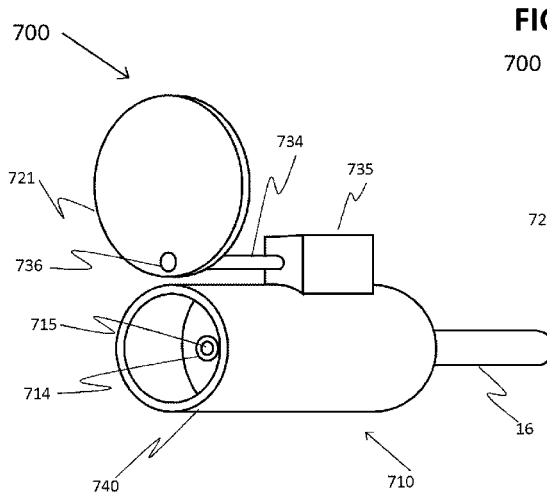
FIG. 6(B) is a perspective view in an open state.
Figure 6C:
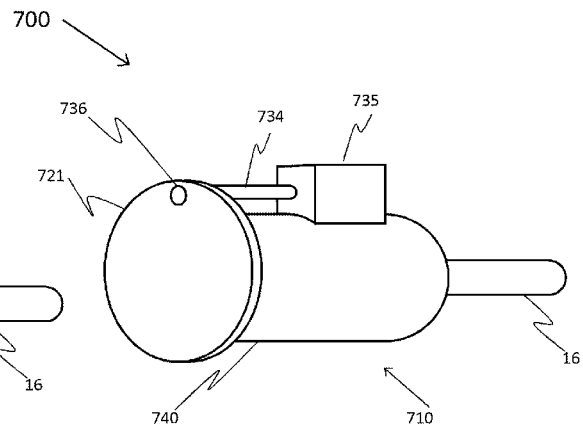
FIG. 6(C) is a perspective view in a closed state.

As illustrated in FIG. 6(A), the configurations of a mounting part 710 and a passage of liquid material are the same as those in Embodiment 1. In the present embodiment, a cylindrical part 740 is provided, and a lid 720 is provided at an end portion of the cylindrical part 740. The length of the cylindrical part 740 is not limited to the illustrated example. The cylindrical part 740 may have any length as long as a lid main body 721 does not come into contact with a tip portion 714 at least during the opening and closing operations. The presence of the cylindrical part 740 can prevent the contact between the tip portion 714 and the lid main body 721. The cylindrical part 740 will be described below in detail.

The lid main body 721 of the present embodiment has an approximately circular shape and is rotatably attached to a driving shaft 734 at a connection portion 736 near the circumference. A prevention member driving unit 730 of the present embodiment is a motor 735 that rotates the driving shaft 734, and with this rotary motion, the lid main body 721 rotates as illustrated in FIGS. 6(B) and 6(C). As a result, the state of the nozzle is switched between the open state in FIG. 6(B) and the closed state in FIG. 6(C). A discharge apparatus control unit 210 switches the states between the open state and the closed state by controlling the start and stop of the rotation of the motor 735 of the prevention member driving unit 730 and the rotation angle. That is, according to the present embodiment, the control operation for opening and closing the discharge port of the nozzle is performed with a relatively simple configuration and control operation, and liquid dripping can be prevented while the discharge is not performed.

The control operation for opening and closing the discharge port can also be performed even by the method using a linear movement in which the lid 720 slides in a direction intersecting the discharge direction, instead of using the rotational movement of the lid 720.

Embodiment 3

The present embodiment also uses a method in which the lid 720 changes its position in a direction intersecting the discharge direction. While the lid 720 is rotated or slid in Embodiment 2, a diaphragm mechanism is used as a lid 720 in the present embodiment.

Figure 7A:
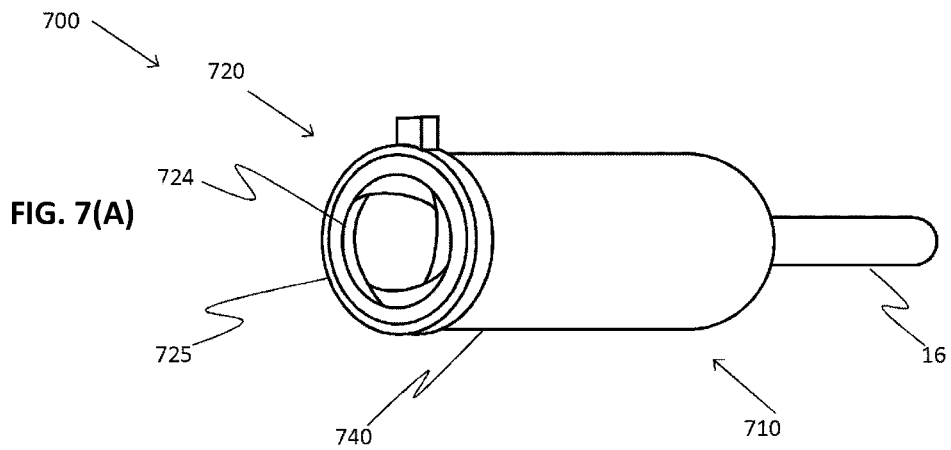
FIG. 7(A) is a perspective view in an open state.
Figure 7B:
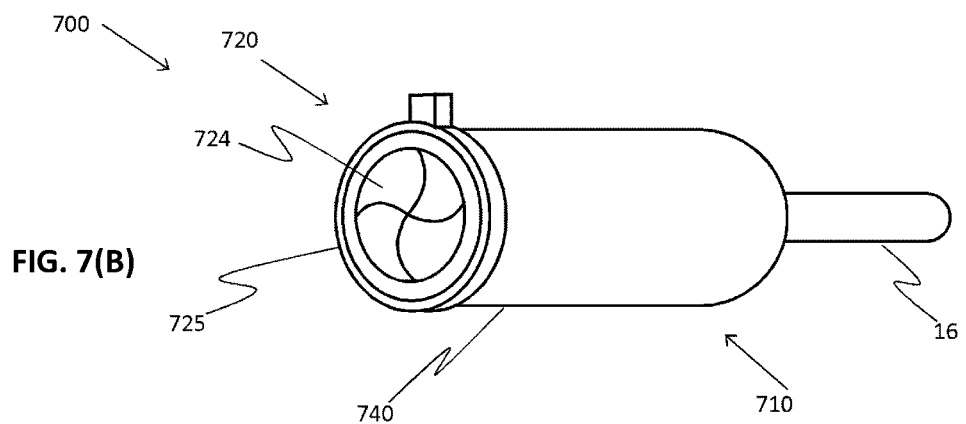
FIG. 7(B) is a perspective view in a closed state.

A liquid dripping prevention member 700 according to Embodiment 3 will be described with reference to FIGS. 7(A) and 7(B). A lid 720 is a diaphragm mechanism provided at an end portion of the cylindrical part 740. The diaphragm mechanism includes a plurality of diaphragm blades 724 and a diaphragm unit 725 that has a cam or the like and accommodates the diaphragm blades 724. As the diaphragm mechanism, a mechanism similar to that used in a camera can be used.

The configuration of the present embodiment can also prevent liquid dripping from the discharge port.

Embodiment 4

Figure 8A:
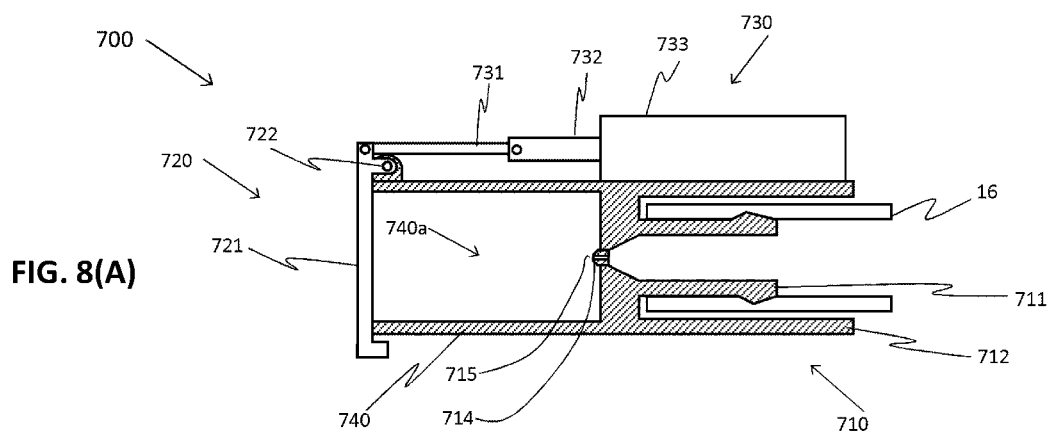
FIG. 8(A) is a perspective view in a closed state.
Figure 8B:
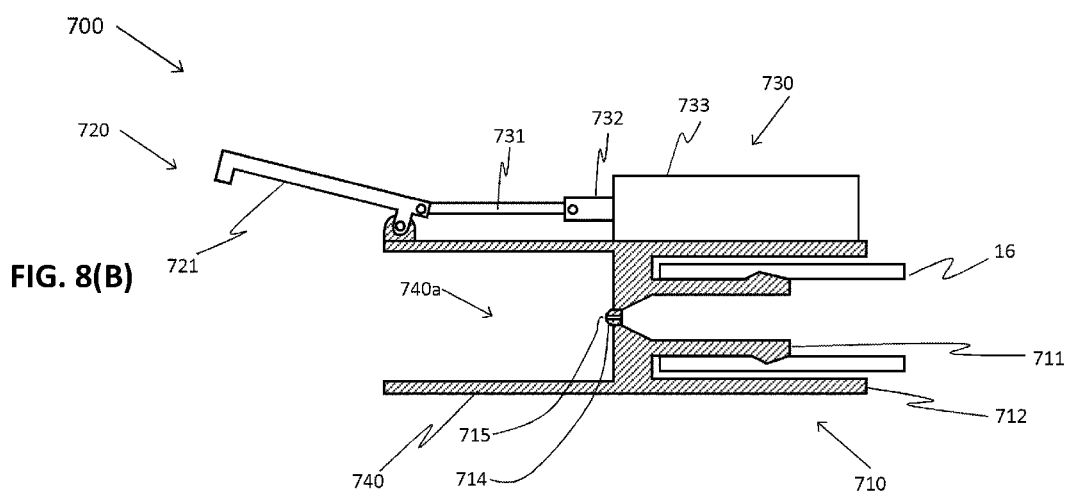
FIG. 8(B) is a perspective view in an open state.

A liquid dripping prevention member 700 according to Embodiment 4 will be described with reference to FIGS. 8(A) and 8(B). The liquid dripping prevention member 700 of the present embodiment includes both a lid 720 and a cylindrical part 740. The cylindrical part 740 is a member that covers a space in a predetermined range in the discharge direction from a discharge port and forms a cylindrical part space 740a to the front in the discharge direction. With the presence of the cylindrical part 740, a certain degree of liquid dripping prevention effect can be obtained even when a lid main body 721 is in the open state. In addition, by setting the lid main body 721 to the closed state, the liquid dripping prevention effect can be further enhanced. The cylindrical part will be described below in detail.

While a solenoid actuator is used as the mechanism for opening and closing the lid in FIG. 8, the present invention is not limited to this example, and any method can be adopted.

Embodiment 5

Figure 9A:
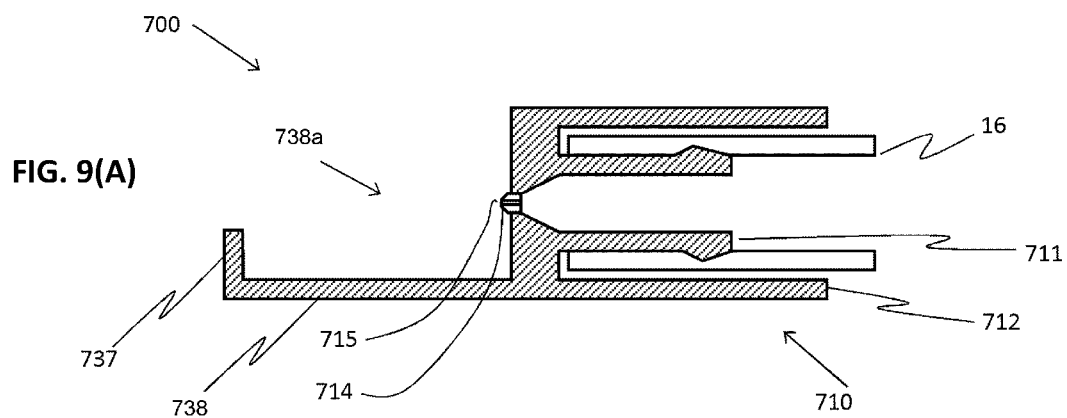
FIG. 9(A) is a cross-sectional view.
Figure 9B:
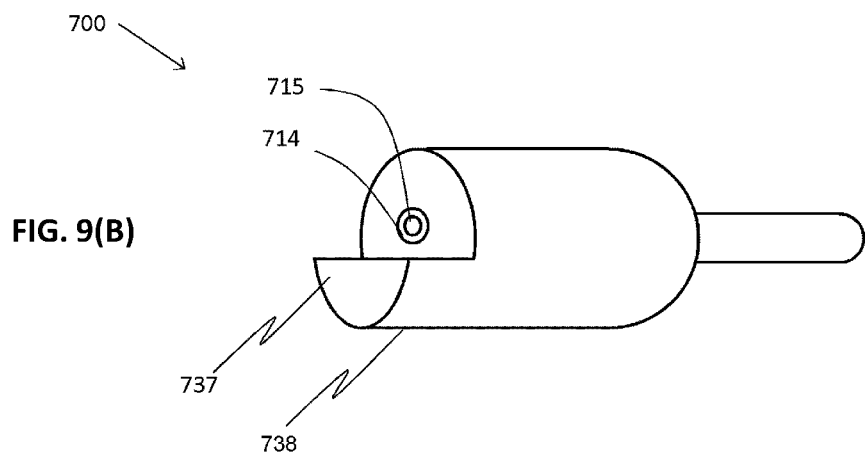
FIG. 9(B) is a perspective view.

A discharge apparatus illustrated in a cross-sectional view in FIG. 9(A) and a perspective view in FIG. 9(B) includes a protruding part 738 having a protruding surface that protrudes forward in the discharge direction of liquid material from a nozzle. The protruding part 738 has a portion that protrudes below the discharge port when the flying object is in the flight state. Thus, the protruding part 738 functions as a receiving unit that receives the liquid material that has dripped. The protruding part 738 may be provided integrally with a mounting part 710 or may be provided separately from the mounting part 710 and used in combination.

In the example of FIG. 9, the protruding surface of the protruding part 738 is provided with a wall-shaped portion 737 extending perpendicularly from a front end portion in the discharge direction. Therefore, even when the amount of liquid material that has dripped is large, the protruding part functions as a storage portion of the liquid material so that the possibility of the liquid material leaking to the outside is reduced. However, even in a case where the wall-shaped portion 737 is not provided, with the presence of the protruding part 738 functioning as a receiving unit, a certain degree of liquid dripping prevention performance can be obtained.

According to the present embodiment, since a mechanism for opening and closing the lid is not needed, the liquid dripping prevention effect can be obtained while the possibility of failure is reduced. However, a lid that covers a front space 735a of the discharge port in the discharge direction may also be provided in the liquid dripping prevention member 700 of the present embodiment, and a closed space is formed between the lid and the protruding part so that the effect of preventing leakage may be enhanced. As the mechanism for opening and closing the lid, any mechanism such as the mechanisms described in the other embodiments can be used.

Embodiment 6

Figure 10:
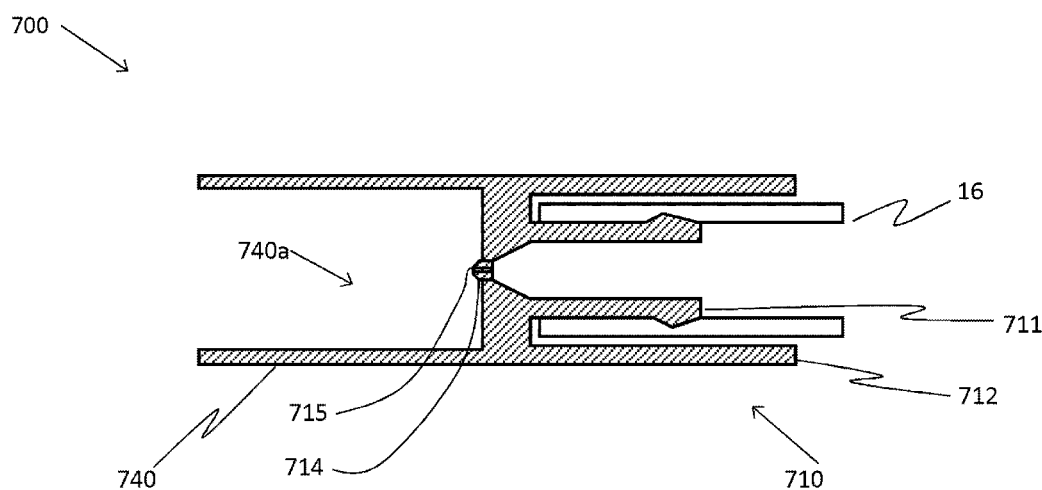
FIG. 10 illustrates a liquid dripping prevention member of an aerosol container according to Embodiment 6.

A discharge apparatus in FIG. 10 includes a cylindrical part 740 that protrudes forward in the discharge direction of liquid material from the periphery of a nozzle. The cylindrical part 740 is formed integrally with a mounting part 710 or is a cylindrical member attached to the mounting part 710. Providing the cylindrical part 740 has an effect of making it difficult for liquid droplets to fall to the outside of the airframe when liquid dripping occurs. The cylindrical part 740 functions as a receiving unit for the liquid material.

In the present embodiment and the other embodiments, the term "cylindrical part" is used. However, the shape of the part is not limited to a strict cylindrical shape. For example, the cross section may be a flat elliptical shape. Alternatively, a shape that has a flat bottom surface, a flat top surface, and a flat side surface, which are connected by a flat surface or a curved surface, may be applied. Further, the cylindrical part may be considered as a kind of protruding part.

Embodiment 7

A liquid dripping prevention member 700 according to Embodiment 7 will be described with reference to FIGS. 11(A) to 11(C). As with the liquid dripping prevention member in Embodiment 6, a liquid dripping prevention member of the present embodiment includes a cylindrical part 740, and the cylindrical part 740 is further provided with a liquid reservoir portion (storage portion) for a case where liquid dripping occurs.

Figure 11A:
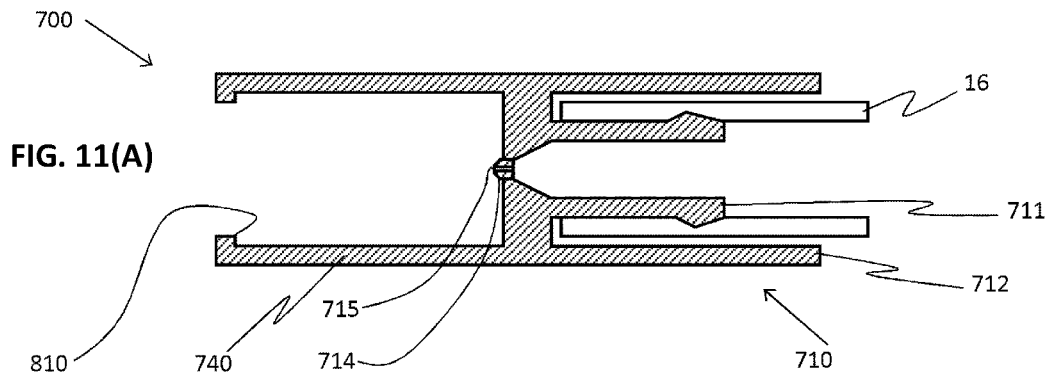
FIG. 11(A) is a cross-sectional view of a damming portion.

The cross-sectional view in FIG. 11(A) illustrates a state in which the cylindrical part 740 is provided with a damming portion 810 as the liquid reservoir portion. The damming portion 810 is a wall-shaped portion provided at the bottom portion (the lower portion in the flight state) of the cylindrical part 740 and prevents the liquid amount that has dripped from leaking from the front end portion of the cylindrical part 740.

Figure 11B:
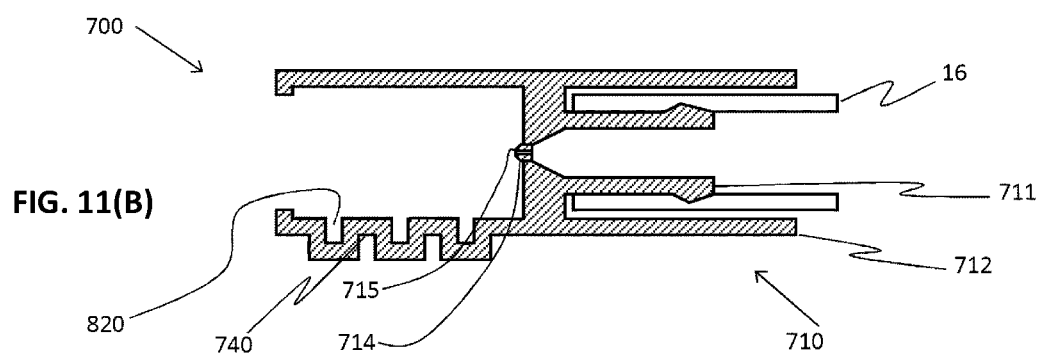
FIG. 11(B) is a cross-sectional view of concave portions.
Figure 11C:
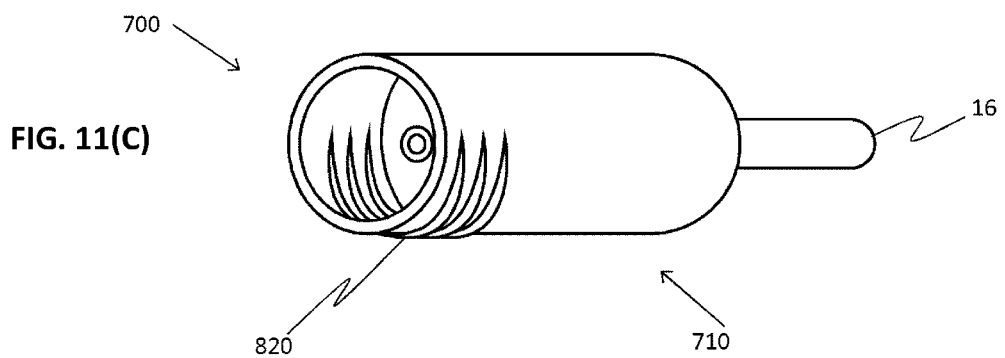
FIG. 11(C) is a perspective view of the concave portions.

The cross-sectional view in FIG. 11(B) and the perspective view of FIG. 11(C) illustrate a state in which the cylindrical part 740 is provided with a concave portion 820 as the liquid reservoir portion. The concave portion 820 is a groove-shaped portion provided at the bottom portion (the lower portion in the flight state) of the cylindrical part 740 and has a function of storing the liquid amount that has dripped. In the illustrated example, a plurality of concave portions 820 is provided to be arranged in a direction intersecting (orthogonal to) the discharge direction.

By providing the damming portion 810 and the concave portion 820 in addition to the cylindrical part 740 as described above, it is possible to effectively prevent the liquid material that has dripped from overflowing to the outside. The number and positions of the damming portions 810 and the number and positions of the concave portions 820 are not limited to the illustrated examples. In addition, a bag-shaped member may be used as a liquid reservoir portion (storage portion) for the liquid material. In this case, by providing the bag-shaped member continuously from the protruding surface serving as the receiving portion of the liquid material, the liquid material can be smoothly guided thereto.

Embodiment 8

A liquid dripping prevention member 700 according to Embodiment 8 will be described with reference to FIGS. 12(A) and 12(B). The liquid dripping prevention member of the present embodiment includes an absorbent material 800 as a solidifying unit of liquid material.

Figure 12A:
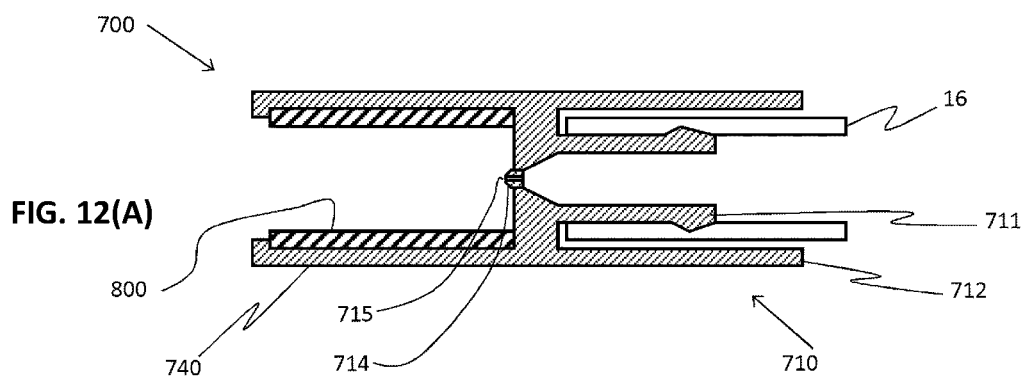
FIG. 12(A) is a cross-sectional view of a configuration in which an absorbent material is provided in a cylindrical part.

A discharge apparatus in FIG. 12(A) includes a cylindrical part 740 located forward in the discharge direction, and an absorbent material 800 is further provided on the inner peripheral surface of the cylindrical part 740. If the absorbent material 800 is provided at least on the bottom surface of the cylindrical part, an effect of absorbing the liquid material that has dripped can be exhibited. As a method for arranging the absorbent material 800, any method such as sticking with an adhesive or the like, fixing with a band or the like, or fitting and fixing can be adopted. While the absorbent material 800 may be directly installed in the cylindrical part, a jig for facilitating carrying and installation of the absorbent material may be used.

As the absorbent material 800, a material capable of effectively absorbing the discharged material is used. For example, when the liquid material to be discharged contains water as a main component, it is preferable to use a polymer absorbent such as a superabsorbent polymer.

Figure 12B:
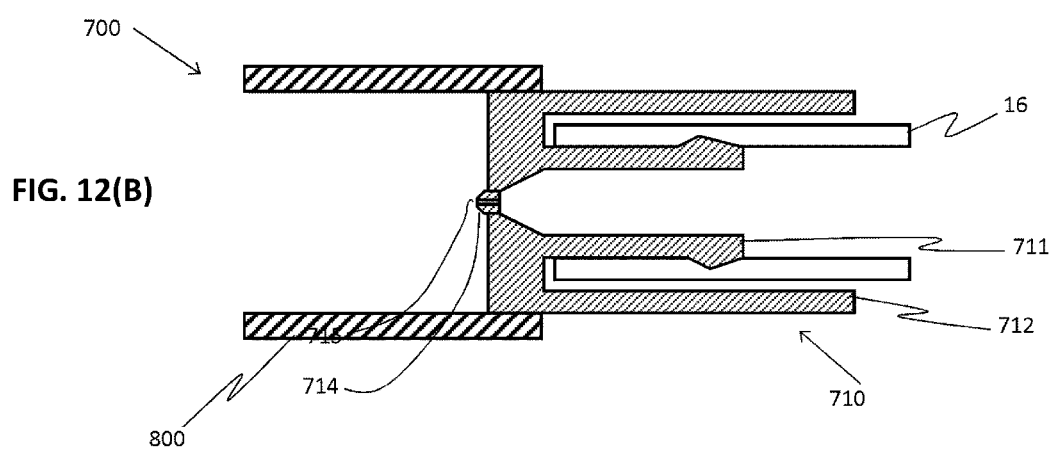
FIG. 12(B) is a cross-sectional view of a cylindrical part formed of the absorbent material.

In a discharge apparatus illustrated in FIG. 12(B), a cylindrical part 740 is formed of the absorbent material 800. To mold the absorbent material 800 into a cylindrical shape, it is preferable to use a frame body made of resin or metal. Alternatively, the absorbent material 800 may be formed using a material having a certain degree of rigidity and being capable of absorbing liquid material, such as felt, diatomaceous earth, or unglazed ceramic.

While the absorbent material is formed into a cylindrical shape here, a configuration in which a protruding part is provided at least below the discharge port may also be adopted.

According to the present embodiment, since the absorbent material 800 as the solidifying unit fixes the liquid material that has dripped from the discharge port, the liquid dripping prevention effect is enhanced.

Embodiment 9

A liquid dripping prevention member 700 according to Embodiment 9 will be described with reference to FIGS. 13(A) and 13(B). The liquid dripping prevention member of the present embodiment also includes an absorbent material 800 as a solidifying unit of liquid material.

Figure 13A:
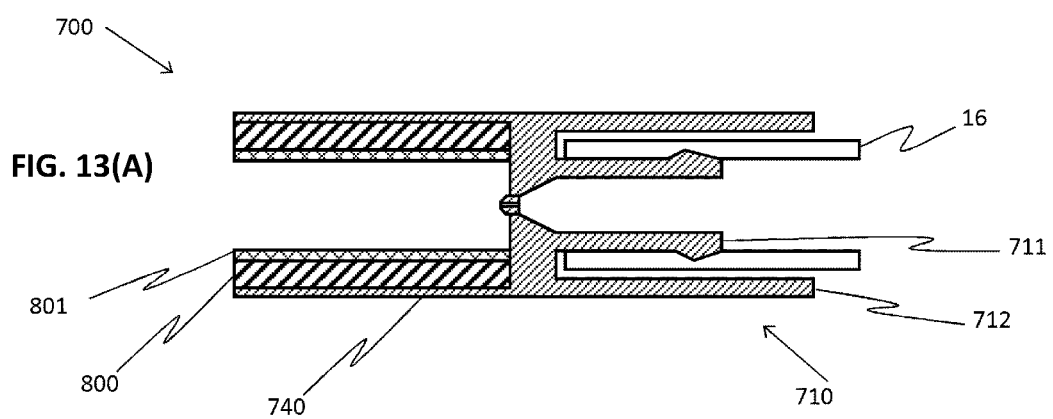
FIG. 13(A) is a cross-sectional view.
Figure 13B:
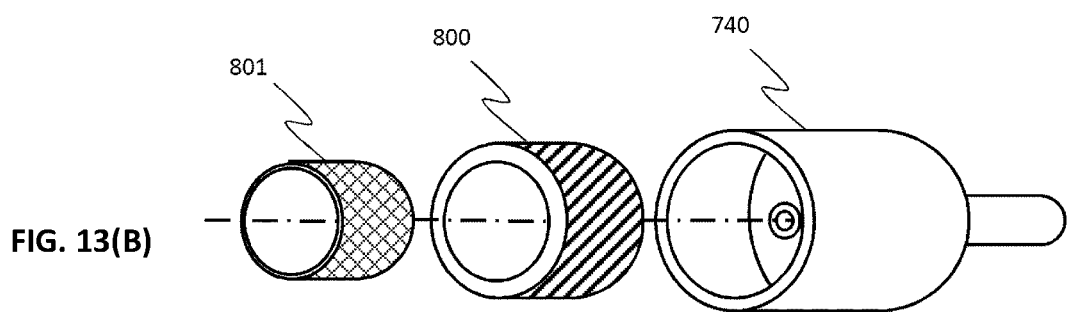
FIG. 13(B) is an exploded perspective view illustrating a configuration of an absorbent material.

A discharge apparatus in FIG. 13(A) includes a cylindrical part 740 located forward in the discharge direction, and the absorbent material 800 is provided on the inner peripheral surface of the cylindrical part 740. Further inside the absorbent material 800, a permeation part 801 made of a stainless-steel mesh through which liquid material permeates is provided. Such a configuration can be realized, for example, as illustrated in FIG. 13(B), by mounting the absorbent material 800 on the inner peripheral surface of the cylindrical part 740 and further mounting the permeation part 801 on the inner peripheral surface of the absorbent material 800.

According to this configuration, the dripping liquid material permeates through the permeation part 801 and is absorbed by the absorbent material 800 to be fixed. Thus, the liquid material does not leak to the outside. Further, in a case where the absorbent material 800 is made of a material that absorbs moisture, such as a high polymer, since the permeation part 801 functions as a member that suppresses the expansion of the absorbent material that has expanded by absorbing moisture, the expanded absorbent material does not block the discharge port. Thus, it is possible to continue to use the discharge apparatus without deterioration of the original discharge performance.

Embodiment 10

As the solidifying unit, other than the absorbent material 800, a heating part that heats and evaporates liquid material or a cooling part that cools and solidifies liquid material can also be used. As such a solidifying unit, a Peltier element capable of controlling both heating and cooling is suitable. If only heating is performed, an electric heating member such as a nichrome wire heater can also be used. Alternatively, by fixing a heating unit, such as a portable body warmer, or a cooling unit, such as a cooling gel, to the protruding part or the cylindrical part with a band or the like, solidification by heating or cooling can be performed. In a case where a lid is provided, as in the case with the absorbent material, the solidifying unit that performs heating or cooling may be provided at a position facing the discharge port inside the lid.

Embodiment 11

In the embodiments described above, various methods for preventing liquid dripping, such as the method in which a lid is used, the method in which a liquid reservoir portion is provided, and the method in which an absorbent material have been described. These methods can be used in any combination with each other as long as there is no contradiction.

Figure 14A:
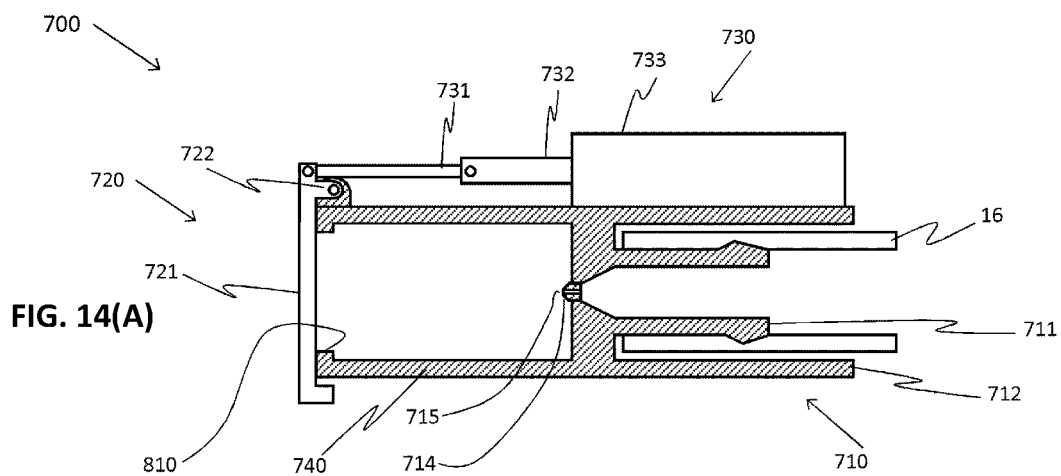
FIG. 14(A) is a cross-sectional view of a damming portion.
Figure 14B:
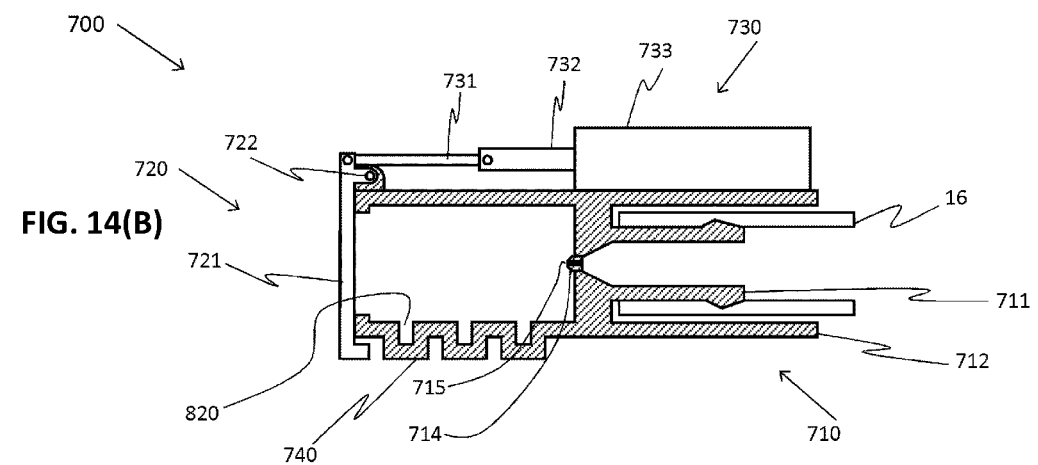
FIG. 14(B) is a cross-sectional view of concave portions.

For example, FIG. 14(A) illustrates a configuration including a lid main body 721 that is openable and closable as well as a damming portion 810 that is provided at the front end of a cylindrical part 740. FIG. 14(B) illustrates a configuration including a lid main body 721 that is openable and closable as well as a cylindrical part 740 that is provided with a plurality of groove-shaped concave portions 820 arranged in a direction intersecting the discharge direction.

Figure 15A:
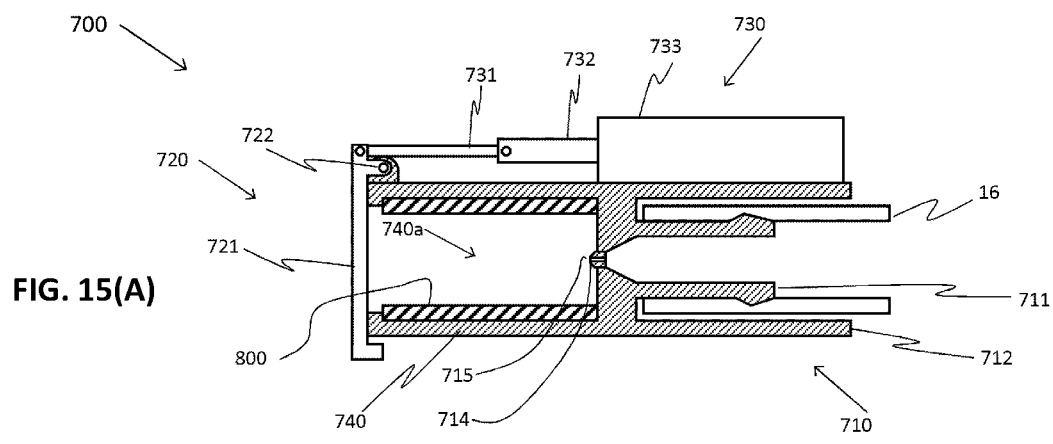
FIG. 15(A) is perspective view in a closed state.
Figure 15B:
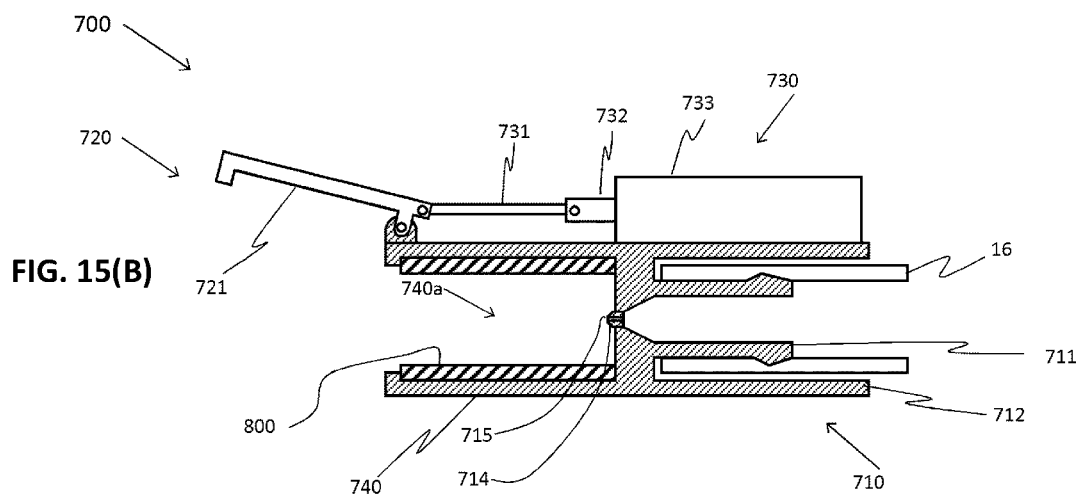
FIG. 15(B) is a perspective view in an open state.

FIGS. 15(A) and 15(B) illustrate a configuration including a lid main body 721 that is openable and closable as well as an absorbent material 800 that is provided on the inner peripheral surface of a cylindrical part 740. FIG. 15(A) illustrates a closed state, and FIG. 15(B) illustrates an open state.

In this way, by combining a plurality of methods, the effect of the liquid dripping prevention member 700 can be enhanced. For example, in a configuration in which the lid is provided, it is preferable to provide an absorbent material that absorbs the liquid material in a portion of the lid facing the discharge port when the lid is in the closed state.

Embodiment 12

Figure 16A:
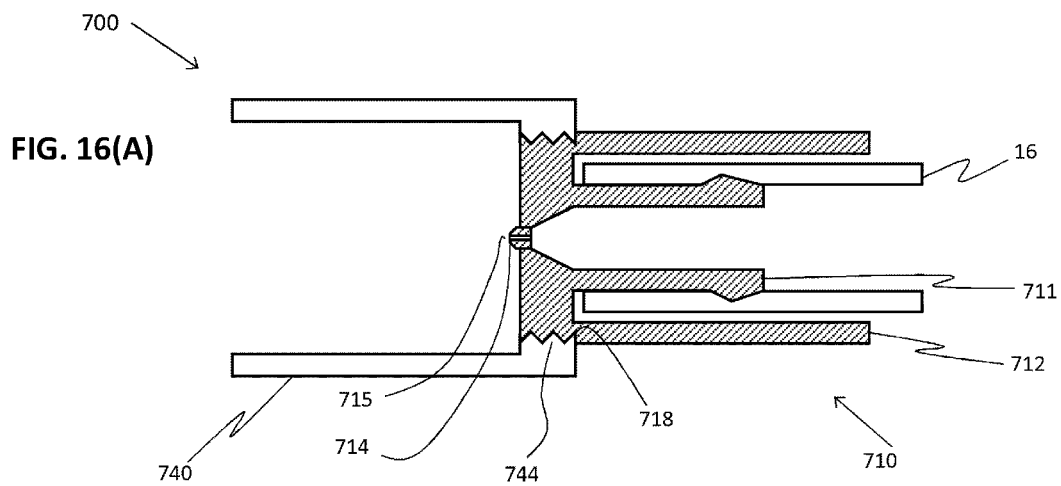
FIG. 16(A) is a cross-sectional view.

In the present embodiment, an example of a configuration method of the liquid dripping prevention member 700 will be described. In the present embodiment, a cylindrical part 740 is the liquid dripping prevention member 700. The cylindrical part 740 is detachable from a mounting part 710 via screw members serving as an engaging portion. That is, as illustrated in FIG. 16(A), a thread groove 744 formed on the inner surface of an opening provided at one end portion of the cylindrical part 740 is guided by a thread groove 718 formed on an end portion of the mounting part 710 so that the cylindrical part 740 is screwed into the mounting part 710. The liquid dripping prevention member 700 is thereby formed. The thread grooves provided on both the members can be collectively considered as a screw portion.

Figure 16B:
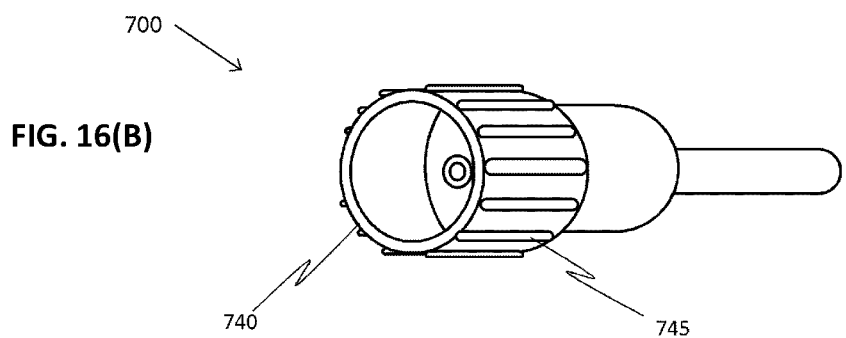
FIG. 16(B) is a perspective view.

Here, it is preferable to provide an anti-slip portion 745 on the outer peripheral surface of the cylindrical part 740 as illustrated in FIG. 16(B). When the cylindrical part 740 is assembled to the mounting part 710 in the present embodiment, the cylindrical part 740 is rotated about the longitudinal direction as an axis. Thus, a plurality of anti-slip portions extending in a direction orthogonal to the direction of the rotational movement, that is, in the longitudinal direction, is provided.

According to the present embodiment, the cylindrical part 740 can be easily replaced, and this improves maintainability.

Embodiment 13

Figure 17A:
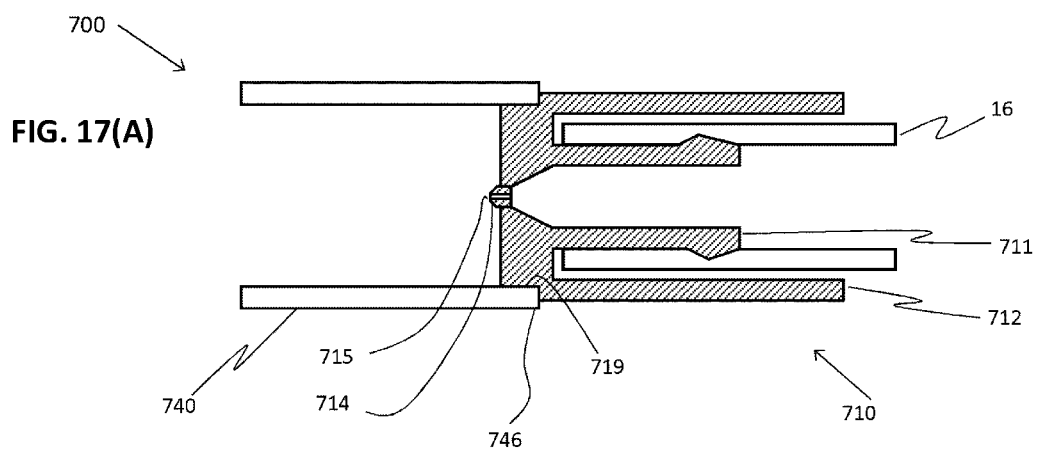
FIG. 17(A) is a cross-sectional view.

In the present embodiment, another example of a configuration method of the liquid dripping prevention member 700 will be described. A cylindrical part 740, which is the liquid dripping prevention member according to the present embodiment, is also detachable from a mounting part 710. That is, as illustrated in FIG. 17(A), an insertion portion 746 as an engaging portion provided at one end portion of the cylindrical part 740 is fitted into an insertion receiving portion 719 provided at an end portion of the mounting part 710. The liquid dripping prevention member 700 is thereby formed. The insertion portion 746 and the insertion receiving portion 719 can be collectively considered as a fitting portion.

Figure 17B:
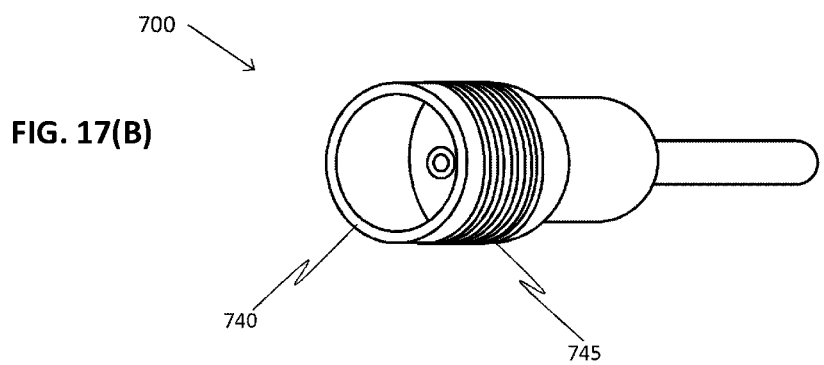
FIG. 17(B) is a perspective view.

Here, as illustrated in FIG. 17(B), it is preferable to provide an anti-slip portion 745 on the outer peripheral surface of the cylindrical part 740. When the cylindrical part 740 is assembled to the mounting part 710 in the present embodiment, forces act on the cylindrical part 740 in the longitudinal direction. Therefore, a plurality of anti-slip portions is provided in a direction orthogonal to the direction of the forces, that is, in the circumferential direction of the cylindrical part. According to the present embodiment, the cylindrical part 740 can be easily replaced, and this improves maintainability.

The liquid dripping prevention members of the embodiments described above can be used in any combination as long as no contraction occurs therebetween. For example, the liquid dripping prevention effect can be improved by freely combining the presence or absence of the cylindrical part or the protruding part, the presence or absence of the absorbent material, the presence or absence of the concave portion or the damming portion, or the like.

In each embodiment described above, the example in which a multicopter is used as the flying object on which the liquid material discharge apparatus is mounted has been described. However, the discharge apparatus of the moving object according to the present invention can be applied to a helicopter, can be applied not only to a flying object using a rotor but also to an unmanned aircraft such as a fixed-wing aircraft, an airship, and a gliding aircraft, and can be applied not only to an unmanned aircraft but also to a manned aircraft. Further, not only to a flying object, the present invention can also be widely applied to various manned or unmanned moving objects such as a vehicle traveling on a track and a vehicle traveling on a road surface.

REFERENCE SIGNS LIST

1: Discharge apparatus, 10: Aerosol container, 11a: Body portion, 11b: Bottom portion, 11d: Mounting cup, 12: Stem, 12a: Discharge flow path, 12b: Stem hole, 13: Valve mechanism, 13a: Gasket, 13b: Spring, 14: actuator, 14a: Main body, 14b: Flange portion, 15: Nozzle, 15a: Jetting hole, 16: Coupling tube, 16a: Inner space 20: Sleeve, 21: Sleeve main body, 21a: Radial support part, 22: End cover part, 221: Pressing member, 221a: Cylindrical body, 221b: End flange portion, 222: Cover main body, 23: End cover part, 223: Screw cylinder, 231: Cylindrical part, 232: End plate 30: Discharge driving unit, 30A: Driving part, 30B: Contact member, 30C: External valve, 30D: Duct, 31: Motor, 32: Cam mechanism, 32a: Cam, 32b: Cam follower 40: Aerosol container assembly, 50: Discharge apparatus supporting part, 72: Container holding part, 72a: Circular plate portion, 72b: Annular convex portion, 72c: Coupling axial portion, 73: Anti-slip material 100: Flying object, 101: Airframe, 102: Airframe body, 103: Arm, 104: Rotor, 105: Motor, 106: Camera, 107: Leg, 110: Flight control unit, 112: Flight communication unit 120: Control terminal, 160: Operation terminal, 161: Front end portion, 163: Discharge button, 164: Stop button, 167: Display 180: Tank, 182: Pump 210: Discharge apparatus control unit, 211: Discharge apparatus power supply, 212: Discharge apparatus communication unit, 301: Frame 700: Prevention member, 710: Mounting part, 711: Inner fitting part, 711: Mounting part, 711: Inner fitting part, 711a: Inner space, 711c: Pressure contact portion, 712: Outer fitting part, 713: End surface, 714: Tip portion, 715: Passage hole, 716: Inner wall, 718: Thread groove, 719: Insertion receiving portion 720: Lid, 722: Lid connection part, 723: Lid body concave portion, 724: Diaphragm blade, 725: Unit 730: Prevention member driving unit, 731: Linear motion connecting member, 732: Linear motion part, 733: Base, 734: Driving shaft, 735: Motor, 735: Protruding part, 735a: Front space, 736: Connection portion, 737: Wall-shaped portion, 740: Cylindrical part, 740a: Cylindrical part space, 744: Thread groove, 745: Anti-slip portion, 746: Insertion portion 800: Absorbent material, 801: Permeation part, 810: Damming portion, 820: Concave portion

The invention claimed is:

1. A discharge apparatus for a flying object, the discharge apparatus discharging liquid material from a nozzle mounted on an airframe, the discharge apparatus comprising:
   a lid that is capable of opening and closing a discharge port of the nozzle, and
   a driving unit that opens and closes the lid.

2. The discharge apparatus for a flying object according to claim 1, wherein the lid rotates via a hinge to open and close the discharge port.

3. The discharge apparatus for a flying object according to claim 2, wherein the hinge is provided to be positioned further upward than the discharge port in a perpendicular direction when the flying object is in a flight state.

4. The discharge apparatus for a flying object according to claim 2, wherein the lid has a concave portion that is provided at a position facing the discharge port when in a closed state and that prevents interference with the discharge port.

5. The discharge apparatus for a flying object according to claim 1, wherein the lid opens and closes the discharge port by sliding in a direction perpendicular to a discharge direction of the liquid material.

6. The discharge apparatus for a flying object according to claim 5, wherein the lid slides by rotational movement or linear movement.

7. The discharge apparatus for a flying object according to claim 5, wherein the lid is a diaphragm mechanism having a plurality of diaphragm blades.

8. The discharge apparatus for a flying object according to claim 1, wherein the lid and the discharge port are positioned such that the discharge port does not abut on the lid when the lid is in a closed state.

9. The discharge apparatus for a flying object according to claim 1, wherein the lid is provided with an absorbent material that absorbs the liquid material at a position facing the discharge port when the lid is in a closed state.

10. The discharge apparatus for a flying object according to claim 1, further comprising: a solidifying unit that receives and fixes the liquid material that has dripped from a discharge port of the discharge apparatus, wherein the solidifying unit is provided at a position facing the discharge port when the lid is in a closed state.

11. The discharge apparatus for a flying object according to claim 10, wherein the solidifying unit includes an absorbent material.

12. The discharge apparatus for a flying object according to claim 1, wherein the discharge apparatus discharges liquid material stored in an aerosol container or a tank mounted on the airframe.

13. A discharge apparatus for a flying object, the discharge apparatus discharging liquid material from a nozzle mounted on an airframe, the discharge apparatus comprising: a receiving unit that is provided forward in a discharge direction of the discharging from a discharge port of the discharge apparatus, so as to receive the liquid material that has dripped from the discharge port, wherein the receiving unit has a protruding surface that protrudes further downward than the discharge port in a perpendicular direction when the flying object is in a flight state and forward in a discharge direction when viewed from the discharge port, and the discharge apparatus further comprising: a lid that is openable and closable, the lid forming a closed space together with the protruding surface in a discharge direction from the discharge port when in a closed state, and enabling the liquid material to be discharged to outside from the discharge port when in an open state.

14. The discharge apparatus for a flying object according to claim 13, wherein the protruding surface is provided with an absorbent material that absorbs the liquid material.

15. The discharge apparatus for a flying object according to claim 13, wherein the protruding surface is provided with a damming portion for preventing leakage of the liquid material.

16. The discharge apparatus for a flying object according to claim 13, wherein the protruding surface is provided with a concave portion that stores the liquid material.

17. The discharge apparatus for a flying object according to claim 16, wherein the concave portion is provided in plurality and forward in a discharge direction when viewed from the discharge port.

18. The discharge apparatus for a flying object according to claim 13, wherein the protruding surface is a bottom portion of a cylindrical part protruding from a periphery of the discharge port.

19. The discharge apparatus for a flying object according to claim 18, the lid covers a front end of the cylindrical part when in a closed state, and enabling the liquid material to be discharged to outside from the discharge port when in an open state.

20. A control method of a discharge apparatus for a flying object, the discharge apparatus including an opening and closing mechanism and a lid capable of opening and closing a discharge port of a nozzle, the control method comprising:

causing, in coordination with a discharge operation by a discharge driving unit, a lid driving unit, which drives the lid, to perform an operation for closing the lid when the discharge operation ends and to perform an operation for opening the lid when the discharge operation starts.

* * * * *